US012461951B1

(12) United States Patent
Trinh et al.

(10) Patent No.: US 12,461,951 B1
(45) Date of Patent: Nov. 4, 2025

(54) PARCEL GROWTH MODEL TRAINING SYSTEM

(71) Applicant: CoreLogic Solutions, LLC, Irvine, CA (US)

(72) Inventors: Kien Trong Trinh, San Diego, CA (US); Daniel Lawrence Gossett, Round Rock, TX (US); Charles Presley Reynolds, Austin, TX (US); Hans Christian Dumke, Lafayette, CO (US); Bin He, Philadelphia, PA (US)

(73) Assignee: CoreLogic Solutions, LLC, Irvine, CA (US)

( * ) Notice: Subject to any disclaimer, the term of this patent is extended or adjusted under 35 U.S.C. 154(b) by 0 days.

(21) Appl. No.: 18/370,779

(22) Filed: Sep. 20, 2023

Related U.S. Application Data

(60) Provisional application No. 63/409,141, filed on Sep. 22, 2022.

(51) Int. Cl.
  *G06F 16/29* (2019.01)
  *G06F 16/2457* (2019.01)
(52) U.S. Cl.
  CPC ........ *G06F 16/29* (2019.01); *G06F 16/24573* (2019.01)
(58) Field of Classification Search
  CPC ............. G06F 16/245–24573; G06F 16/29
  See application file for complete search history.

(56) References Cited

U.S. PATENT DOCUMENTS

| | | | |
|---|---|---|---|
| 5,193,185 A | * | 3/1993 | Lanter ............... G06F 16/29 |
| 5,857,174 A | | 1/1999 | Dugan |
| 7,890,509 B1 | | 2/2011 | Pearcy et al. |

(Continued)

FOREIGN PATENT DOCUMENTS

| | | | | |
|---|---|---|---|---|
| CA | 3165715 A1 | * | 7/2021 | ............ G06F 18/22 |
| CN | 101419623 | | 9/2010 | |

(Continued)

OTHER PUBLICATIONS

"Knowledge graph embedding," Wikipedia, Oct. 25, 2023, 9 pages. URL: https://en.wikipedia.org/w/index.php?title=Knowledge_graph_embedding&oldid=1181784194.

(Continued)

*Primary Examiner* — Robert W Beausoliel, Jr.
*Assistant Examiner* — Nirav K Khakhar
(74) *Attorney, Agent, or Firm* — Knobbe Martens Olson & Bear, LLP

(57) ABSTRACT

An improved parcel growth prediction system that uses parcel data, population data, and artificial intelligence to predict the growth of a geographic area at a micro level (e.g., a real estate parcel level) is described herein. For example, the improved parcel growth prediction system may generate a graph model and apply the graph model as an input to an artificial intelligence model to predict the likelihood that a particular parcel may be developed some time in the future. Ultimately, implementing the improved parcel growth prediction system described herein may lead to more precise placements of infrastructure projects and/or to infrastructure projects that more precisely support the needs of the population of a geographic area as time passes.

20 Claims, 15 Drawing Sheets

(56) References Cited

U.S. PATENT DOCUMENTS

| | | | |
|---|---|---|---|
| 8,732,219 | B1 | 5/2014 | Ferries et al. |
| 10,248,731 | B1 | 4/2019 | Brouwer et al. |
| 10,303,816 | B2 | 5/2019 | Nakazawa |
| 10,496,678 | B1 | 12/2019 | Tang |
| 10,521,943 | B1 | 12/2019 | Phillips et al. |
| 10,726,509 | B1 | 7/2020 | Cannon et al. |
| 11,301,774 | B2 | 4/2022 | Garcia Duran et al. |
| 11,373,233 | B2 | 6/2022 | Pande et al. |
| 11,373,257 | B1 | 6/2022 | Guo et al. |
| 11,657,633 | B1* | 5/2023 | Vandivere ............ G06F 16/9024 382/176 |
| 11,971,263 | B1 | 4/2024 | Malshe et al. |
| 2003/0158668 | A1 | 8/2003 | Anderson |
| 2003/0158801 | A1 | 8/2003 | Chuah |
| 2005/0288957 | A1 | 12/2005 | Eraker et al. |
| 2009/0132469 | A1 | 5/2009 | White et al. |
| 2013/0328882 | A1 | 12/2013 | Pirwani et al. |
| 2014/0365470 | A1 | 12/2014 | Diamond et al. |
| 2015/0120455 | A1 | 4/2015 | McDevitt et al. |
| 2015/0186951 | A1* | 7/2015 | Wilson ............... G06Q 30/0269 705/14.66 |
| 2015/0213160 | A1 | 7/2015 | Bright et al. |
| 2016/0259841 | A1* | 9/2016 | Andrew ................ G06Q 50/16 |
| 2016/0299639 | A1 | 10/2016 | Adams et al. |
| 2016/0379388 | A1* | 12/2016 | Rasco .................... G06Q 10/04 715/753 |
| 2017/0287080 | A1 | 10/2017 | Aruswamy et al. |
| 2017/0316324 | A1* | 11/2017 | Barrett ................... G06N 20/20 |
| 2018/0121577 | A1 | 5/2018 | Taylor et al. |
| 2018/0158158 | A1 | 6/2018 | Coogan-Pushner |
| 2019/0050491 | A1 | 2/2019 | Mask et al. |
| 2019/0272669 | A1* | 9/2019 | Esposito ................. G06F 40/30 |
| 2020/0380086 | A1 | 12/2020 | Ivanov et al. |
| 2020/0402116 | A1 | 12/2020 | Avrahami et al. |
| 2021/0019325 | A1 | 1/2021 | Edge et al. |
| 2021/0037394 | A1 | 2/2021 | Wainer et al. |
| 2021/0325891 | A1* | 10/2021 | Young .................. G05D 1/0221 |
| 2022/0084079 | A1 | 3/2022 | Stewart |
| 2022/0180169 | A1 | 6/2022 | Gore et al. |
| 2022/0222758 | A1 | 7/2022 | Beckman |
| 2022/0292543 | A1* | 9/2022 | Henderson ......... G06Q 30/0252 |
| 2022/0327643 | A1 | 10/2022 | Law et al. |
| 2022/0335307 | A1 | 10/2022 | Wang et al. |
| 2022/0383417 | A1* | 12/2022 | Cummings ............ G06Q 40/06 |
| 2023/0029218 | A1 | 1/2023 | Bhamidipaty et al. |
| 2023/0119132 | A1 | 4/2023 | Cebulski et al. |
| 2023/0153931 | A1 | 5/2023 | Lee |
| 2024/0273637 | A1 | 8/2024 | Gibson et al. |
| 2024/0394813 | A1 | 11/2024 | Trinh et al. |
| 2025/0200618 | A1 | 6/2025 | Trinh et al. |

FOREIGN PATENT DOCUMENTS

| | | |
|---|---|---|
| CN | 113627977 A | 11/2021 |
| CN | 115018215 | 9/2022 |
| CN | 115271825 A | 11/2022 |
| WO | 2023/141579 A1 | 7/2023 |
| WO | 2024/249178 A1 | 12/2024 |
| WO | 2025/136982 A1 | 6/2025 |

OTHER PUBLICATIONS

Han, S., et al., "Improving Real Estate Appraisal with POI Integration and Areal Embedding," arXiv.org, Artificial Intelligence (cs.AI), Nov. 20, 2023, 13 pages.

International Search Report and Written Opinion for PCT Application No. PCT/US24/030350, mailed Oct. 16, 2024.

International Search Report and Written Opinion for PCT Application No. PCT/US24/060576, mailed Feb. 12, 2025.

Li, C.C., et al., "Look Around! A Neighbor Relation Graph Learning Framework for Real Estate Appraisal," arXiv.org, Machine Learning (cs.LG), Dec. 23, 2022, 10 pages.

Lin, S. "Home Embeddings for Similar Home Recommendations," Zillow, Oct. 17, 2018 (accessed May 21, 2024), 11 pages. URL: https://www.zillow.com/tech/embedding-similar-home-recommendation/.

Rao, B., et al., "An approach to merging of two community subgraphs to form a community graph using graph mining techniques," IEEE International Conference on Computational Intelligence and Computing Research, Dec. 18, 2014, pp. 460-466.

Trawinski, B., et al., "Comparison of expert algorithms with machine learning models for real estate appraisal", 2017 IEEE International Conference on Innovations in Intelligent Systems and Applications (INISTA), 2017, pp. 51-54.

Wu, P., et al., "Urban parcel grouping method based on urban form and functional connectivity characterisation," International Journal of Geo-Information, Jun. 2019, vol. 8, 27 pages.

Yang, A., et al., "Graph Convolutional Network-Based Model for Megacity Real Estate Valuation," IEEE Access, vol. 10, Sep. 2022, pp. 104811-104828.

Ye, X., et al., "Automating land parcel classification for neighborhood-scale urban analysis," International Journal of Digital Earth, 2019, vol. 12, pp. 1396-1405.

Yu, Y., et al., "Research on real estate pricing methods based on data mining and machine learning", Neural Computing & Applications, 2021, vol. 33, pp. 3925-3937.

Zhang, W., et al., "MugRep: A Multi-Task Hierarchical Graph Representation Learning Framework for Real Estate Appraisal", Proceedings of the 27th ACM SIGKDD Conference on Knowledge Discovery & Data Mining (KDD '21), 2021, pp. 3937-3947.

Zhang, W., et al., "MugRep: A Multi-Task Hierarchical Graph Representation Learning Framework for Real Estate Appraisal," arXiv.org, Machine Learning (cs.LG), Aug. 2, 2021, 11 pages.

* cited by examiner

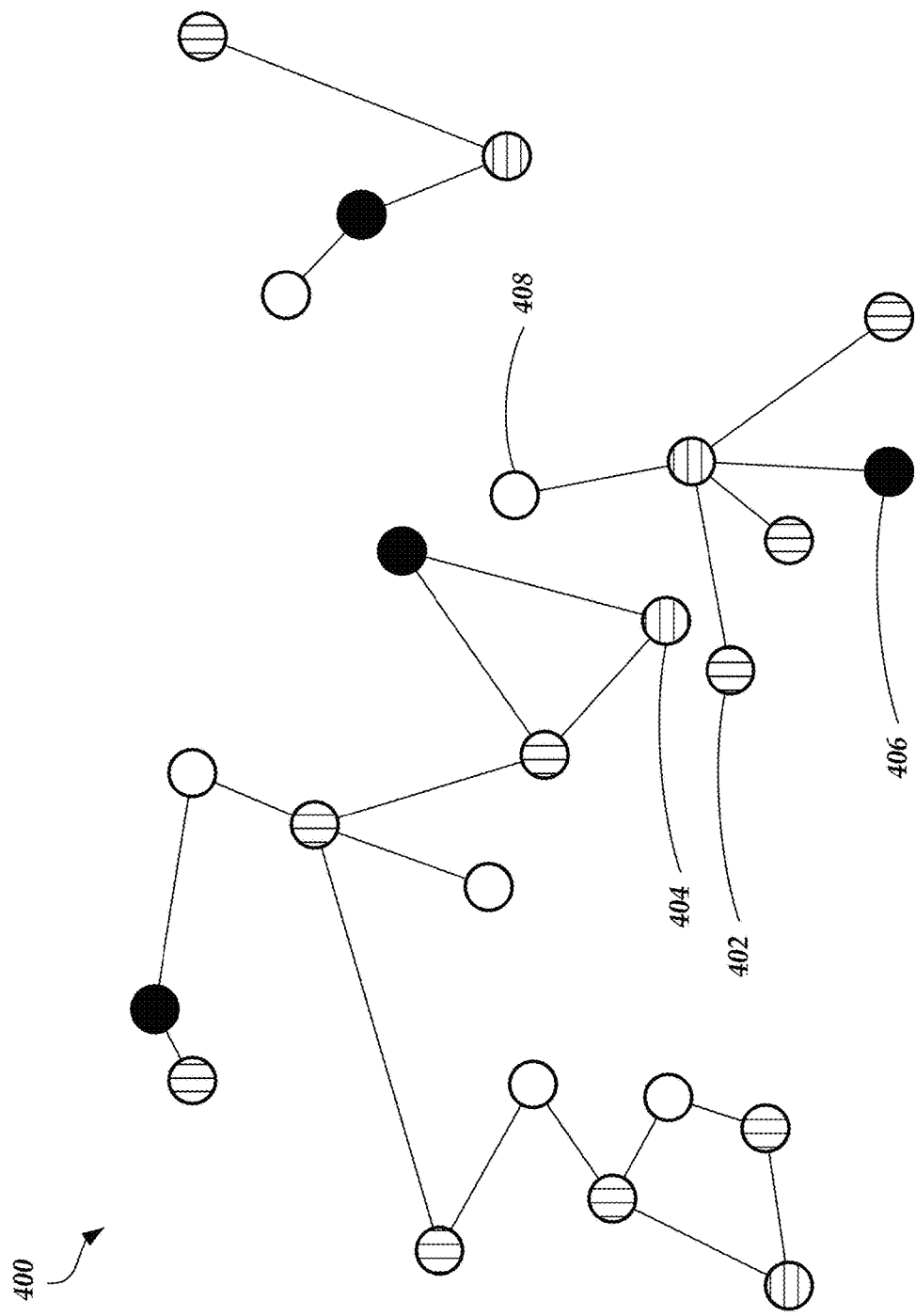

PARCEL GROWTH MODEL TRAINING SYSTEM

CROSS-REFERENCE TO RELATED APPLICATIONS

This application claims the benefit of U.S. Provisional Application No. 63/409,141, entitled "PARCEL GROWTH MODEL TRAINING SYSTEM" and filed on Sep. 22, 2022, which is hereby incorporated by reference herein in its entirety.

TECHNICAL FIELD

The present disclosure generally relates to using artificial intelligence to predict real estate parcel growth over varying time periods.

BACKGROUND

Having the proper infrastructure, such as telephone lines, power lines, sewers, roads, bridges, pipelines, schools, and/or the like, is important to support a population. For example, as the population of a city or other jurisdiction grows, the residents of the city or other jurisdiction my increase usage of the existing infrastructure. The increased usage of the existing infrastructure may lead to a deterioration in the quality of the infrastructure and/or the infrastructure reaching its capacity limits. Thus, it may be important to increase the amount of infrastructure as a population grows to address the quality deterioration and/or capacity issues. However, population growth may not be uniform within a particular geographic area, and therefore the increase in infrastructure likely should not be uniform within the particular geographic area either. It can be difficult, however, to identify where population growth may occur, and therefore where additional infrastructure should be placed.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system for generating a graph model. The system comprises memory that stores computer-executable instructions. The system further comprises a processor in communication with the memory, wherein the computer-executable instructions, when executed by the processor, cause the processor to: obtain parcel data for one or more parcels in a geographic area, wherein each parcel in the one or more parcels is represented by a polygon defined by a geographic boundary of the respective parcel indicated in the parcel data; apply the parcel data as an input to a subdivision name extraction machine learning model to determine a subdivision name for each parcel in the one or more parcels; for each parcel, apply the determined subdivision name for the respective parcel as an input to a subdivision name classifier; determine that, for each parcel, the determined subdivision name for the respective parcel is correct based on an output of the subdivision name classifier; for each parcel in the one or more parcels that has a first subdivision name, enlarge a size of the polygon that represents the respective parcel; merge the enlarged polygons of each parcel in the one or more parcels that has the first subdivision name to form a merged polygon; determine a first centroid of the merged polygon; and connect the first centroid of the merged polygon with a second centroid of another polygon that at least partially intersects the merged polygon to form the graph model.

The system of the preceding paragraph can include any sub-combination of the following features: where the parcel data comprises a legal description for each parcel in the one or more parcels, and wherein the computer-executable instructions, when executed, further cause the processor to apply, for each parcel in the one or more parcels, the legal description for the respective parcel as an input to the subdivision name extraction machine learning model to determine the subdivision name for the respective parcel; where the parcel data comprises a legal description for each parcel in the one or more parcels, and wherein the computer-executable instructions, when executed, further cause the processor to: for each parcel, apply a representation of the legal description for the respective parcel as an input to a legal description classifier to determine a land-use code for the respective parcel, for each parcel in the one or more parcels that has a first subdivision name and that has a first land-use code, enlarge a size of the polygon that represents the respective parcel, and merge the enlarged polygons of each parcel in the one or more parcels that has the first subdivision name and the first land-use code to form the merged polygon; where a split year of the merged polygon comprises an earliest year in which a structure was built on one of the one or more parcels that has the first subdivision name; the computer-executable instructions, when executed, further cause the processor to: for each parcel in the one or more parcels that has a second subdivision name, enlarge a size of the polygon that represents the respective parcel, merge the enlarged polygons of each parcel in the one or more parcels that has the second subdivision name to form a second merged polygon, determine a third centroid of the second merged polygon, and connect the third centroid of the second merged polygon with a fourth centroid of a fourth polygon that at least partially intersects the second merged polygon; where the fourth polygon corresponds to a vacant lot; where the graph model comprises the first, second, third, and fourth centroids; where the parcel data further comprises at least one of a subdivision name field or a legal description field; where the subdivision name extraction machine learning model outputs a subdivision name for a first parcel in the one or more parcels based on an extraction of the subdivision name from the subdivision name field; where the subdivision name extraction machine learning model outputs a subdivision name for a first parcel in the one or more parcels based on an extraction of the subdivision name from the legal description name field; and where the computer-execution instructions, when executed, further cause the processor to train the subdivision name extraction machine learning model using training data, wherein an element in the training data corresponds to a first parcel in a subset of the one or more parcels and includes parcel data for the first parcel that is labeled to indicate at least one of a first portion of the parcel data for the first parcel that corresponds to a subdivision name or a second portion of the parcel data for the first parcel that does not correspond to the subdivision name.

Another aspect of the disclosure provides a computer-implemented method for generating a graph model. The computer-implemented method further comprises: obtaining parcel data for one or more parcels in a geographic area, wherein each parcel in the one or more parcels is represented by a polygon defined by a geographic boundary of the respective parcel indicated in the parcel data; applying the parcel data as an input to a subdivision name extraction machine learning model to determine a subdivision name for each parcel in the one or more parcels; for each parcel, applying the determined subdivision name for the respective parcel as an input to a subdivision name classifier; for each parcel in the one or more parcels that has a first subdivision name, enlarging a size of the polygon that represents the respective parcel; merging the enlarged polygons of each parcel in the one or more parcels that has the first subdivision name to form a merged polygon; determining a first centroid of the merged polygon; and connecting the first centroid of the merged polygon with a second centroid of another polygon that at least partially intersects the merged polygon to form the graph model.

The computer-implemented method of the preceding paragraph can include any sub-combination of the following features: where the computer-implemented method further comprises: for each parcel, applying the determined subdivision name for the respective parcel as an input to a subdivision name classifier, and determining that, for each parcel, the determined subdivision name for the respective parcel is correct based on an output of the subdivision name classifier; where the computer-implemented method further comprises: for each parcel, applying the determined subdivision name for the respective parcel as an input to a subdivision name classifier, and determining that, for a first parcel in the one or more parcels, the determined subdivision name for the first parcel is incorrect based on an output of the subdivision name classifier; where the parcel data comprises a legal description for each parcel in the one or more parcels, and wherein applying the parcel data as an input to a subdivision name extraction machine learning model further comprises applying, for each parcel in the one or more parcels, the legal description for the respective parcel as an input to the subdivision name extraction machine learning model to determine the subdivision name for the respective parcel; where the parcel data comprises a legal description for each parcel in the one or more parcels, and wherein merging the enlarged polygons of each parcel in the one or more parcels that has the first subdivision name further comprises: for each parcel, applying a representation of the legal description for the respective parcel as an input to a legal description classifier to determine a land-use code for the respective parcel, for each parcel in the one or more parcels that has a first subdivision name and that has a first land-use code, enlarging a size of the polygon that represents the respective parcel, and merging the enlarged polygons of each parcel in the one or more parcels that has the first subdivision name and the first land-use code to form the merged polygon; where a split year of the merged polygon comprises an earliest year in which a structure was built on one of the one or more parcels that has the first subdivision name; and where the computer-implemented method further comprises: for each parcel in the one or more parcels that has a second subdivision name, enlarging a size of the polygon that represents the respective parcel, merging the enlarged polygons of each parcel in the one or more parcels that has the second subdivision name to form a second merged polygon, determining a third centroid of the second merged polygon, and connecting the third centroid of the second merged polygon with a fourth centroid of a fourth polygon that at least partially intersects the second merged polygon; where the fourth polygon corresponds to a vacant lot; where the graph model comprises the first, second, third, and fourth centroids; where the parcel data further comprises at least one of a subdivision name field or a legal description field; where the subdivision name extraction machine learning model outputs a subdivision name for a first parcel in the one or more parcels based on an extraction of the subdivision name from the subdivision name field; and where the computer-implemented method further comprises training the subdivision name extraction machine learning model using training data, wherein an element in the training data corresponds to a first parcel in a subset of the one or more parcels and includes parcel data for the first parcel that is labeled to indicate at least one of a first portion of the parcel data for the first parcel that corresponds to a subdivision name or a second portion of the parcel data for the first parcel that does not correspond to the subdivision name.

Another aspect of the disclosure provides a non-transitory, computer-readable medium comprising computer-executable instructions for generating a graph model, wherein the computer-executable instructions, when executed by a computer system, cause the computer system to: obtain parcel data for one or more parcels in a geographic area, wherein each parcel in the one or more parcels is represented by a polygon defined by a geographic boundary of the respective parcel indicated in the parcel data; determine one or more first parcels in the one or more parcels that share a characteristic using the parcel data; merge polygons of each first parcel in the one or more first parcels that share the characteristic to form a merged polygon; and connect the merged polygon with a second polygon identified using a polygon relationship identification operation to form the graph model.

The non-transitory, computer-readable medium of the preceding paragraph can include any sub-combination of the following features: where the characteristic comprises one of a subdivision name or a land-use code; where the computer-executable instructions, when executed, further cause the computer system to: apply the parcel data as an input to a subdivision name extraction machine learning model to determine a subdivision name for each parcel in the one or more parcels, for each parcel, apply the determined subdivision name for the respective parcel as an input to a subdivision name classifier, and determine that, for each parcel, the determined subdivision name for the respective parcel is correct based on an output of the subdivision name classifier; where the computer-executable instructions, when executed, further cause the computer system to train the subdivision name extraction machine learning model using training data, wherein an element in the training data corresponds to a first parcel in a subset of the one or more parcels and includes parcel data for the first parcel that is labeled to indicate at least one of a first portion of the parcel data for the first parcel that corresponds to a subdivision name or a second portion of the parcel data for the first parcel that does not correspond to the subdivision name; where the computer-executable instructions, when executed, further cause the computer system to: for each parcel in the one or more first parcels that shares the characteristic, enlarge a size of the polygon that represents the respective parcel, merge the enlarged polygons of each parcel in the one or more first parcels that shares the characteristic to form the merged polygon, determine a centroid of the merged polygon, and connect the centroid of the merged polygon with a second centroid of the second polygon, wherein the merged polygon at least partially intersects the second polygon; where the second polygon corresponds to a vacant lot; and where the graph model comprises the first and second centroids.

Another aspect of the disclosure provides a system for training a parcel growth artificial intelligence model. The system comprises memory that stores computer-executable instructions. The system further comprises a processor in communication with the memory, wherein the computer-executable instructions, when executed by the processor, cause the processor to: obtain a graph model corresponding to a geographic area, wherein the graph model comprises a first node that corresponds to a first parcel and that is connected to a second node that corresponds to a second parcel; update a status of the first node to reflect a development status of the first parcel at a first time; update a status of the second node to reflect a development status of the second parcel at the first time; train the parcel growth artificial intelligence model using the graph model with the updated status of the first node corresponding to the first time and the updated status of the second node corresponding to the first time; update a status of the first node to reflect a development status of the first parcel at a second time; update a status of the second node to reflect a development status of the second parcel at the second time; apply the graph model with the updated status of the first node corresponding to the second time and the updated status of the second node corresponding to the second time as an input to the trained parcel growth artificial intelligence model to obtain a growth probability; and validate the trained parcel growth artificial intelligence model using the growth probability and historical data corresponding to a development or lack of development of the first and second parcels by the second time.

The system of the preceding paragraph can include any sub-combination of the following features: where the computer-executable instructions, when executed, further cause the processor to: determine an error rate based on the validation of the trained parcel growth artificial intelligence model, and re-train the trained parcel growth artificial intelligence model in response to a determination that the error rate exceeds a threshold value; where the computer-executable instructions, when executed, further cause the processor to re-train the trained parcel growth artificial intelligence model using a hyperparameter that is different than a hyperparameter used to train the parcel growth artificial intelligence model; where the development status of the first parcel at the first time comprises one of a developed state, an undeveloped state, or a vacant state; where the undeveloped state is the first parcel has not been developed at least within a threshold time period of the first time; where the developed state is a structure was built on the first parcel at least within a threshold time period of the first time; where the development status of the first parcel at the first time is a developed state, wherein the development status of the second parcel at the first time is a vacant state, wherein the development status of the first parcel at the second time is the developed state, and wherein the development status of the second parcel at the second time is the developed state; where the computer-executable instructions, when executed, further cause the processor to update metadata of the first node to reflect the development status of the first parcel at the first time; where the parcel growth artificial intelligence model comprises a machine learning model; and where the second time is after the first time and before a current time.

Another aspect of the disclosure provides a computer-implemented method for training a parcel growth artificial intelligence model. The computer-implemented method comprises: obtaining a graph model corresponding to a geographic area, wherein the graph model comprises a first node that corresponds to a first parcel and that is connected to a second node that corresponds to a second parcel; updating a status of the first node to reflect a status of the first parcel at a first time; updating a status of the second node to reflect a status of the second parcel at the first time; training the parcel growth artificial intelligence model using the graph model with the updated status of the first node corresponding to the first time and the updated status of the second node corresponding to the first time; updating a status of the first node to reflect a status of the first parcel at a second time; updating a status of the second node to reflect a status of the second parcel at the second time; applying the graph model with the updated status of the first node corresponding to the second time and the updated status of the second node corresponding to the second time as an input to the trained parcel growth artificial intelligence model to obtain a growth probability; and validating the trained parcel growth artificial intelligence model using the growth probability and historical data corresponding to a development or lack of development of the first and second parcels by the second time.

The computer-implemented method of the preceding paragraph can include any sub-combination of the following features: where the computer-implemented method further comprises: determining an error rate based on the validation of the trained parcel growth artificial intelligence model, and re-training the trained parcel growth artificial intelligence model in response to a determination that the error rate exceeds a threshold value; where re-training the trained parcel growth artificial intelligence model further comprises re-training the trained parcel growth artificial intelligence model using a hyperparameter that is different than a hyperparameter used to train the parcel growth artificial intelligence model; where the status of the first parcel at the first time comprises one of a developed state, an undeveloped state, or a vacant state; where the developed state is a structure was built on the first parcel at least within a threshold time period of the first time; and where updating a status of the first node further comprises updating metadata of the first node to reflect the status of the first parcel at the first time.

Another aspect of the disclosure provides a non-transitory, computer-readable medium comprising computer-executable instructions for training a parcel growth artificial intelligence model, wherein the computer-executable instructions, when executed by a computer system, cause the computer system to: obtain a graph model corresponding to a geographic area, wherein the graph model comprises a first node that corresponds to a first parcel and that is connected to a second node that corresponds to a second parcel; train the parcel growth artificial intelligence model using the graph model with a status of the first node corresponding to a first time and a status of the second node corresponding to the first time; apply the graph model with a status of the first node corresponding to a second time and a status of the second node corresponding to the second time as an input to the trained parcel growth artificial intelligence model to obtain a growth probability; and validate the trained parcel growth artificial intelligence model using the growth probability and historical data corresponding to a development or lack of development of the first and second parcels by the second time.

The non-transitory, computer-readable medium of the preceding paragraph can include any sub-combination of the following features: where the computer-executable instructions, when executed, further cause the computer system to: determine an error rate based on the validation of the trained parcel growth artificial intelligence model, and re-train the trained parcel growth artificial intelligence model in response to a determination that the error rate exceeds a threshold value; where the computer-executable instructions, when executed, further cause the computer system to re-train the trained parcel growth artificial intelligence model using a hyperparameter that is different than a hyperparameter used to train the parcel growth artificial intelligence model; and where the computer-executable instructions, when executed, further cause the computer system to update metadata of the first node to reflect the status of the first parcel at the first time.

Another aspect of the disclosure provides a system for predicting growth of a parcel. The system comprises memory that stores computer-executable instructions. The system further comprises a processor in communication with the memory, wherein the computer-executable instructions, when executed by the processor, cause the processor to: process a request to predict growth of the parcel, wherein the parcel resides in a geographic area, obtain a parcel growth artificial intelligence model and a graph model corresponding to the geographic area, update the graph model to reflect a current status of the parcel and one or more other parcels in the geographic area, apply the updated graph model as an input to the parcel growth artificial intelligence model to generate a growth probability for the parcel, determine a growth prediction for the parcel using the growth probability and population data, and cause generation of a visualization of the growth prediction.

The system of the preceding paragraph can include any sub-combination of the following features: where the visualization comprises one of a table or an interactive user interface; where the interactive user interface comprises a geographic map that depicts the parcel and an indication of the growth prediction; where the growth prediction corresponds to a first time, and wherein the interactive user interface further comprises a time slider associated with the first time and a second time that, when adjusted from the first time to the second time, causes the geographic map to depict a second growth prediction for the parcel corresponding to the second time; where the graph model comprises a node corresponding to the parcel, and wherein the computer-executable instructions, when executed, further cause the processor to update the node of the graph model to reflect the current status of the parcel; where the current status of the parcel comprises one of an undeveloped state or a vacant state; where the undeveloped state is the parcel has not been developed at least within a threshold time period of a current time; where the computer-executable instructions, when executed, further cause the processor to apply the updated graph model and an indication of the parcel as the input to the parcel growth artificial intelligence model; and where the parcel growth artificial intelligence model outputs a second growth probability for a second parcel in the one or more other parcels, and wherein the computer-executable instructions, when executed, further cause the processor to: rank the growth probability and the second growth probability, determine an average population growth in the geographic area using the population data, determine a number of parcels that includes the parcel and the one or more other parcels to be developed to support the average population growth, and determine the growth prediction based on the growth probability and the number of parcels that includes the parcel and the one or more other parcels to be developed to support the average population growth.

Another aspect of the disclosure provides a computer-implemented method for predicting growth of a parcel. The computer-implemented method further comprises: obtaining a parcel growth artificial intelligence model and a graph model corresponding to a geographic area in which the parcel resides; updating the graph model to reflect a current status of the parcel and one or more other parcels in the geographic area; applying the updated graph model as an input to the parcel growth artificial intelligence model to generate a growth probability for the parcel; determining a growth prediction for the parcel using the growth probability and population data; and causing generation of a visualization of the growth prediction.

The computer-implemented method of the preceding paragraph can include any sub-combination of the following features: where the visualization comprises one of a table or an interactive user interface; where the interactive user interface comprises a geographic map that depicts the parcel and an indication of the growth prediction; where the growth prediction corresponds to a first time, and wherein the interactive user interface further comprises a time slider associated with the first time and a second time that, when adjusted from the first time to the second time, causes the geographic map to depict a second growth prediction for the parcel corresponding to the second time; where the graph model comprises a node corresponding to the parcel, and wherein the computer-executable instructions, when executed, further cause the processor to update the node of the graph model to reflect the current status of the parcel; where applying the updated graph model as an input to the parcel growth artificial intelligence model further comprises applying the updated graph model and an indication of the parcel as the input to the parcel growth artificial intelligence model; and where the parcel growth artificial intelligence model outputs a second growth probability for a second parcel in the one or more other parcels, and wherein determining a growth prediction for the parcel further comprises: ranking the growth probability and the second growth probability, determining an average population growth in the geographic area using the population data, determining a number of parcels that includes the parcel and the one or more other parcels to be developed to support the average population growth, and determining the growth prediction based on the growth probability and the number of parcels that includes the parcel and the one or more other parcels to be developed to support the average population growth.

Another aspect of the disclosure provides a non-transitory, computer-readable medium comprising computer-executable instructions for predicting growth of a parcel, wherein the computer-executable instructions, when executed by a computer system, cause the computer system to: obtain a parcel growth artificial intelligence model and a graph model corresponding to a geographic area in which the parcel resides; apply a first version of the graph model as an input to the parcel growth artificial intelligence model to generate a growth probability for the parcel, wherein the first version of the graph model comprises a current status of the parcel and one or more other parcels in the geographic area; determine a growth prediction for the parcel using the growth probability and population data; and cause generation of a visualization of the growth prediction.

The non-transitory, computer-readable medium of the preceding paragraph can include any sub-combination of the following features: where the visualization comprises one of a table or an interactive user interface; where the interactive user interface comprises a geographic map that depicts the parcel and an indication of the growth prediction; and where the growth prediction corresponds to a first time, and wherein the interactive user interface further comprises a time slider associated with the first time and a second time that, when adjusted from the first time to the second time, causes the geographic map to depict a second growth prediction for the parcel corresponding to the second time.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 4A-4C illustrate an example graph model generated by the parcel graph model generator 121.

DETAILED DESCRIPTION OF SPECIFIC EMBODIMENTS

Figure 1:
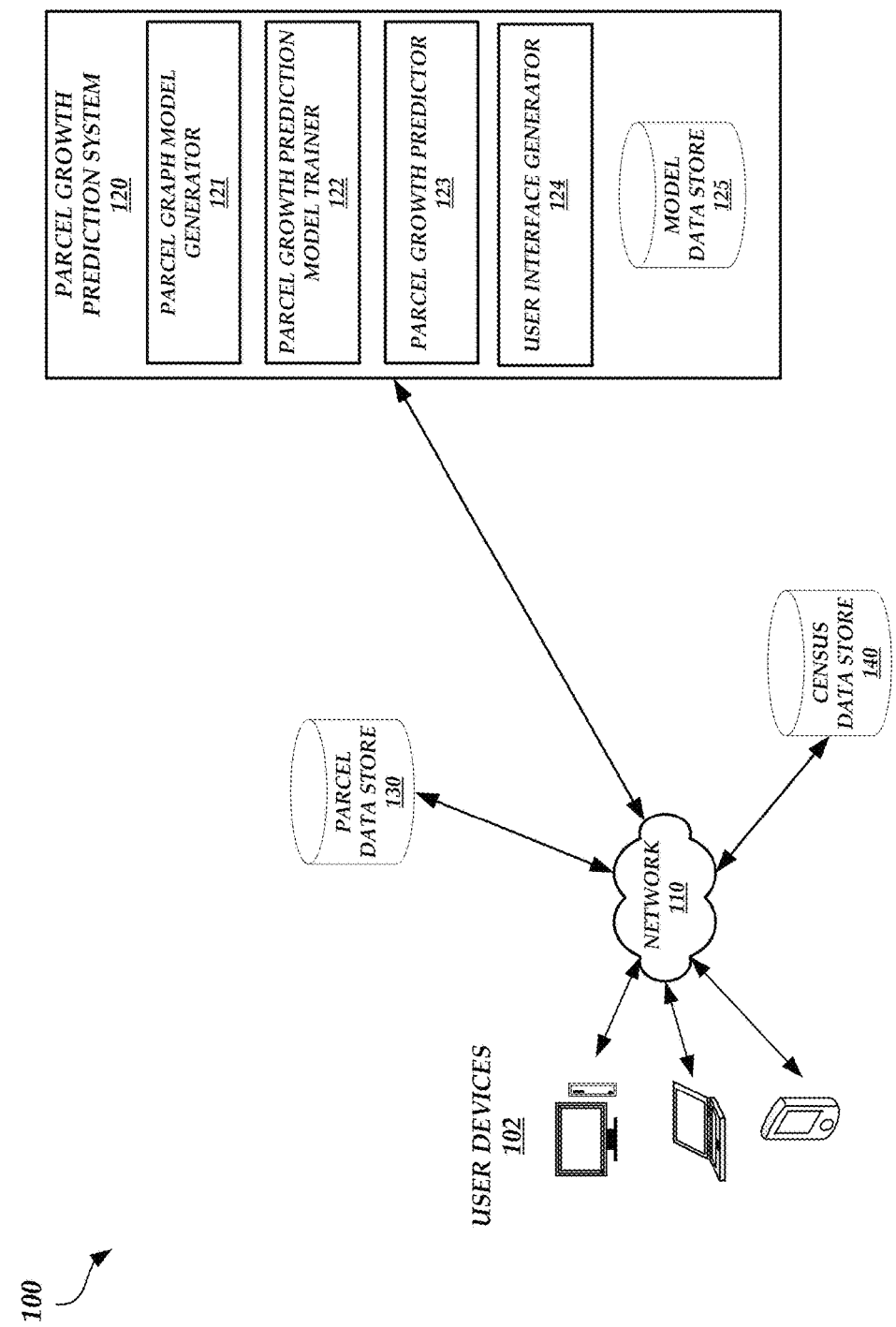
FIG. 1 is a block diagram of an illustrative operating environment in which a parcel growth prediction system uses parcel data, population data, and/or artificial intelligence to predict growth within a geographic area at a micro level (e.g., at a real estate parcel level).

As described above, it can be difficult to identify where population growth may occur, and therefore where additional infrastructure should be placed to support the population growth. Having an understanding of which real estate parcels in a geographic area may see growth in the future, however, may help with the planning of future infrastructure projects. For example, old parcels (e.g., parcels developed more than 20 years ago, 30 years ago, 40 years ago, etc.) and/or vacant parcels may be developed to add housing, commercial districts, business districts, and/or the like. Therefore, it may be useful to develop and/or deploy new infrastructure and/or replace existing infrastructure near such parcels.

Systems currently exist that allow infrastructure developers to understand how a geographic area may change at a macro level (e.g., at a zip code level, a city level, a county level, a state level, etc.). Typical systems, however, have several technical deficiencies that prevent such systems from being used to understand how a geographic area may change at a micro level (e.g., at a real estate parcel level). For example, typical systems rely on image data, such as aerial imagery, to predict how a geographic area may grow in the future. In particular, typical systems may process aerial imagery captured at different points in time to determine changes that may indicate growth (e.g., new structures, new roads, new driveways, land has been cleared of debris or shrubs, etc.), and use this information to determine a percentage of the land in the geographic area that was developed over periods of time. Typical systems then identify this percentage as the percentage of land in the geographic area that may be developed in the future.

However, looking at the past via aerial imagery does not necessarily provide insight as to what portions of a geographic area may be developed in the future. For example, future parcel developments may be more likely to occur near past parcel developments than near parcels that are vacant or that have not been developed in many years. Typical systems, however, may not be able to discern such relationships from processing the aerial imagery because the aerial imagery lacks additional information that identifies, for example, specific parcel(s) depicted in the images and/or parcel(s) where development is identified and/or is not identified. Even if the aerial imagery included such additional information, typical systems still may not be able to discern the relationships described above because typical systems process the aerial images to identify pixels in the images that have changed, not to identify a geographic relationship between pixels in the images that have changed and pixels in the images that have not changed.

Thus, typical systems that use aerial imagery cannot provide geographic area growth estimates at a micro level due to the manner in which typical systems process the aerial imagery and the additional information that the aerial imagery lacks. As a result, any infrastructure planning that relies on outputs from typical systems may lead to the imprecise placement of future infrastructure projects and/or the development of infrastructure projects that provide too much or too little capacity for the geographic area to be served.

Accordingly, described herein is an improved parcel growth prediction system that uses parcel data, population data, and artificial intelligence to predict the growth of a geographic area at a micro level. Ultimately, implementing the improved parcel growth prediction system described herein may lead to more precise placements of infrastructure projects and/or to infrastructure projects that more precisely support the needs of the population of a geographic area as time passes.

For example, the parcel growth prediction system described herein may obtain parcel data (e.g., for each parcel in a set of parcels, geographic coordinates, lot size, percentage of land growth in previous time periods (e.g., 5 years, 10 years, 15 years, etc.), land use type, population growth, household percent growth, distribution of income growth, job and employment density, average distance to work, land slope, soil type, distance to a major road, distance to a central business center, distance to a working center, distance to a lake, river, or other body of water, subdivision name, legal description, etc.) and use the parcel data to determine one or more parcels present in a geographic area and/or the land-use code (e.g., residential, commercial, industrial, etc.) of the parcels. The parcel growth prediction system can then train and use a subdivision name extraction artificial intelligence model (e.g., a machine learning model, a neural network, etc.) or use regular expression and/or statistics to extract, for each parcel in the geographic area, a subdivision name associated with the respective parcel, if present. The parcel growth prediction system can further train and use a subdivision name classifier (e.g., a machine learning model, a neural network, etc.) to determine whether the extracted subdivision names are accurate or inaccurate. Once the classifier has produced the relevant outputs, the parcel growth prediction system can generate and/or obtain one or more polygons that each represent a geographic depiction of a parcel and, for those parcels that have the same, accurate subdivision name and/or land-use code, and combine the polygons corresponding to those parcels to form merged parcels. Thus, the parcel growth prediction system may generate one or more merged parcels from the initial set of parcels in the geographic area. As described in greater detail below, a merged parcel may represent a state of an older parcel prior to the older parcel being subdivided during a development phase. The parcel growth prediction system may assign a development year to each older parcel represented by a merged polygon based on a first year in which one of the parcels whose polygon was merged to form the merged polygon was developed (e.g., a year in which a structure was built on the parcel).

Once the parcel growth prediction system has generated one or more merged polygons, the parcel growth prediction system can generate a graph model that represents connections between one or more merged polygons. For example, the parcel growth prediction system can enlarge a size of each merged polygon and/or any remaining unmerged polygon by a certain percentage or threshold. The parcel growth prediction system can also identify a centroid of each merged polygon and any remaining unmerged polygons and create an initial graph model in which each centroid represents a node in the graph model. After enlarging the merged and/or unmerged polygons, the parcel growth prediction system can determine which merged and/or unmerged polygons at least partially overlap. For those merged and/or unmerged polygons that at least partially overlap, the parcel growth prediction system can connect the centroids of the respective merged and/or unmerged polygons, thereby modifying the graph model to include connections between nodes that represent the centroids of merged and/or unmerged polygons that at least partially overlap each other.

The parcel growth prediction system can use one version of the modified graph model to train a parcel growth artificial intelligence model (e.g., machine learning model, neural network, etc.) to predict the probability that growth will occur in a parcel in the future, can use another version of the modified graph model to validate the trained parcel growth artificial intelligence model, and can use still another version of the modified graph model to apply as an input to the trained parcel growth artificial intelligence model to predict a growth probability for a desired parcel, as described in greater detail below. For example, the parcel growth prediction system can create different versions of the modified graph model by changing the state or status of each node to reflect whether the respective node represents the centroid of a merged parcel that experienced development during a particular time period. In other words, each version of the modified graph model may represent a different point in time or a different period of time. In general, the output of the trained parcel growth artificial intelligence model may be a probability that indicates the likelihood that a parcel may experience growth in the future given that the node(s) of one or more merged parcels connected to the node of the subject parcel have or do not have a state or status indicating that growth occurred in those merged parcel(s) in a prior time period. The parcel growth prediction system can run the trained parcel growth artificial intelligence model multiple times to determine a growth probability for a plurality of parcels in a geographic area.

The parcel growth prediction system can use the growth probability(ies) and/or population data to estimate the likelihood that one or more parcels may be developed within a certain time period (e.g., 1 year, 3 years, 5 years, etc.). For example, the parcel growth prediction system can determine the average population growth over the last N years (e.g., 5 years, 10 years, 20 years, etc.) and use this average to determine the population growth in the next M years (e.g., 1 year, 3 years, 5 years, etc.). In other words, the parcel growth prediction system can estimate that the population of a geographic area will increase at the same rate as the population has increased, on average, over the last N years. The parcel growth prediction system can further determine the number of parcels in the geographic area that would be split to accommodate the increase in population over the next M years. The parcel growth prediction system can rank the parcels for which growth probabilities are predicted, from highest probability to lowest probability, and determine a growth prediction for each of the parcels based on whether it is likely that the respective parcel would be split to accommodate the increase in population over the next M years or whether it is unlikely that the respective parcel would be split to accommodate the increase in population over the next M years given that other, higher-ranked parcels may have enough capacity to support the increased population. A user using a user device may view a user interface that depicts a visualization of the predicted growth probabilities and/or the determined growth predictions.

While the parcel growth prediction system is generally described herein as identifying parcels that were subdivided to form adjacent subdivided parcels to, in part, predict future growth, this is not meant to be limiting. The parcel growth prediction system described herein can be used to predict the probability that a parcel may grow horizontally (e.g., subdivided, outward, etc.) and/or vertically (e.g., with the addition of new floors, such as a high rise apartment building).

The functionality of the parcel growth prediction system can be applied to any type of parcel or set of parcels in a geographic area, such as residential parcels, commercial parcels, industrial parcels, vacant parcels, and/or the like.

The foregoing aspects and many of the attendant advantages of this disclosure will become more readily appreciated as the same become better understood by reference to the following detailed description, when taken in conjunction with the accompanying drawings.

Example Parcel Growth Prediction Environment

FIG. 1 is a block diagram of an illustrative operating environment 100 in which a parcel growth prediction system 120 uses parcel data, population data, and/or artificial intelligence to predict growth within a geographic area at a micro level (e.g., at a real estate parcel level). The operating environment 100 further includes a parcel data store 130 and a census data store 140 that may communicate with the parcel growth prediction system 120 via a network 110 to provide parcel data and population data, respectively. Furthermore, the operating environment 100 includes various user devices 102 that may communicate with the parcel growth prediction system 120 to request and receive parcel growth estimates.

The parcel growth prediction system 120 can be a computing system configured to estimate the likelihood that a parcel may be developed within a certain time period (e.g., 1 year, 3 years, 5 years, etc.). As described herein, development of a parcel can include dividing the parcel into sub-parcels for commercial, industrial, or residential uses, and/or building multi-story structures on the parcel or one or more sub-parcels. For example, the parcel growth prediction system 120 can obtain parcel data, generate a graph model using the parcel data, apply a version of the graph model as an input to a trained parcel growth artificial intelligence model (e.g., a parcel growth machine learning model), and estimate the likelihood using the output of the parcel growth machine learning model and population data.

The parcel growth prediction system 120 may be a single computing device, or it may include multiple distinct computing devices, such as computer servers, logically or physically grouped together to collectively operate as a server system. The components of the parcel growth prediction system 120 can each be implemented in application-specific hardware (e.g., a server computing device with one or more ASICs) such that no software is necessary, or as a combination of hardware and software. In addition, the modules and components of the parcel growth prediction system 120 can be combined on one server computing device or separated individually or into groups on several server computing devices. In some embodiments, the parcel growth prediction system 120 may include additional or fewer components than illustrated in FIG. 1.

In some embodiments, the features and services provided by the parcel growth prediction system 120 may be implemented as web services consumable via the communication network 110. In further embodiments, the parcel growth prediction system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The parcel growth prediction system 120 may include various modules, components, data stores, and/or the like to provide the parcel growth estimation functionality described herein. For example, the parcel growth prediction system 120 may include a parcel graph model generator 121, a parcel growth prediction model trainer 122, a parcel growth predictor 123, a user interface generator 124, and a model data store 125.

The parcel graph model generator 121 can generate a graph model for one or more geographic areas (e.g., a city, a zip code, a county, a state, etc.) using parcel data from the parcel data store 130. The graph model may include one or more nodes, at least some of which are interconnected, where each node may represent a centroid of a polygon that represents a parcel that exists currently or that existed some time in the past. Parcel data can include various fields, such as, for each parcel in a set of parcels, geographic coordinates of the respective parcel, lot size of the respective parcel, percentage of land growth in previous time periods (e.g., 5 years, 10 years, 15 years, etc.) of the respective parcel or in a geographic area in which the respective parcel resides, land use type of the respective parcel, population growth in the respective parcel or geographic area in which the respective parcel resides, household percent growth in the respective parcel or a geographic area in which the respective parcel resides, distribution of income growth in the respective parcel or in a geographic area in which the respective parcel resides, job and employment density in the respective parcel or in a geographic area in which the respective parcel resides, average distance to work for residents in the respective parcel or in a geographic area in which the respective parcel resides, land slope of the respective parcel, soil type in the respective parcel, distance to a major road from the respective parcel, distance to a central business center from the respective parcel, distance to a working center from the respective parcel, distance to a lake, river, or other body of water from the respective parcel, subdivision name associated with the respective parcel, legal description of the respective parcel, and/or the like.

To generate the graph model for a geographic area, the parcel graph model generator 121 can use the parcel data to identify a geographic boundary of one or more parcels in the geographic area, to identify a subdivision name associated with each parcel, if one exists, and/or to identify a land-use code associated with each parcel, if one exists. For example, the parcel graph model generator 121 can form a polygon for each parcel that is in a shape of the geographic boundary of the respective parcel. To identify the subdivision name associated with a parcel, the parcel graph model generator 121 can use a subdivision name extraction artificial intelligence model (e.g., a subdivision name extraction machine learning model) trained by the parcel growth prediction model trainer 122 (e.g., if the subdivision name is missing from the parcel data or potentially incorrect) or can use regular expression and/or statistics (e.g., can identify the name directly from the parcel data, such as in a situation in which the name is present in a subdivision name field in the parcel data, in a legal description field in the parcel data, etc.). In particular, a subdivision name may be missing from the parcel data and/or the parcel data may not have been updated to include a subdivision name, and the subdivision name extraction artificial intelligence model can be trained to determine the subdivision name despite these issues. The parcel growth prediction model trainer 122 can obtain training data corresponding to one or more parcels, where each element in the training data corresponds to a particular parcel and includes parcel data for the particular parcel that is labeled to indicate which portion of the parcel data corresponds to a subdivision name (e.g., a subdivision name field in the parcel data, a legal description field in the parcel data, etc.) and/or which portion of the parcel data does not correspond to a subdivision name (e.g., a job and employment density field in the parcel data, an average distance to work field in the parcel data, etc.). The parcel growth prediction model trainer 122 can then train a subdivision name extraction machine learning model for a geographic area using the training data corresponding to one or more parcels in the geographic area, where the subdivision name extraction machine learning model may be trained to output an indication of a field in the parcel data corresponding to a parcel from which a subdivision name of the parcel may be extracted. The parcel growth prediction model trainer 122 may train one or more subdivision name extraction machine learning models that are each associated with a particular geographic area.

The parcel graph model generator 121 can then apply the obtained parcel data for a geographic area that corresponds to a particular parcel as an input to the trained subdivision name extraction machine learning model associated with the geographic area, which causes the trained subdivision name extraction machine learning model to indicate a field in the inputted parcel data that may include a subdivision name associated with the particular parcel. The parcel graph model generator 121 can repeat this operation for one or more parcels, therefore obtaining for each parcel an indication of a field in the parcel data corresponding to the respective parcel that may include a subdivision name associated with the respective parcel. Sometimes, however, the identified field may not include a correct subdivision name (e.g., parcel data for vacant land may include a field that identifies a subdivision name that is the same as the subdivision name associated with parcels in a nearby neighborhood, which is not correct). Thus, the parcel graph model generator 121 can then use a subdivision name classifier to verify whether a purported subdivision name in the identified fields is indeed a subdivision name or is not a subdivision name.

For example, the parcel growth prediction model trainer 122 can train the subdivision name classifier using training data that includes, for one or more parcels, a label indicating whether a name found in a particular parcel data field (e.g., a subdivision name field, a legal description field, etc.) is a subdivision name or is not a subdivision name. The training data, for each parcel, may include text (e.g., a value of a subdivision name field, a value of a legal description field, etc.) in addition to the label, where some or all of the words in the text are weighted by the parcel growth prediction model trainer 122 by determining a term frequency-inverse document frequency (tf-idf) measure for the respective word. For example, a subdivision name may usually be found in a subdivision name field in the parcel data. However, a name found in the subdivision name field may be misspelled and therefore not represent the actual subdivision name of the parcel. Similarly, a name found in the subdivision name field may be the name of a former owner of the parcel rather than an actual subdivision name of the parcel. The parcel growth prediction model trainer 122 can train one or more subdivision name classifiers, where each classifier may be associated with a geographic area.

To verify whether a purported subdivision name in the identified fields is indeed a subdivision name or is not a subdivision name, the parcel graph model generator 121 can apply an output of the subdivision name extraction machine learning model (e.g., an identification of a field that may include a subdivision name) and/or the parcel data itself as an input to the subdivision name classifier. Applying this input to the subdivision name classifier may cause the subdivision name classifier to output an indication of whether the field does or does not include a subdivision name. The parcel graph model generator 121 can repeat this operation for some or all of the fields identified by the subdivision name extraction machine learning model.

Thus, the parcel graph model generator 121 may use the subdivision name extraction machine learning model and/or the subdivision name classifier to determine, for one or more parcels in a geographic area, a likely subdivision name associated with the respective parcel.

To identify the land-use code associated with a parcel, the parcel graph model generator 121 can use a legal description classifier trained by the parcel growth prediction model trainer 122 or another model trainer (not shown) (e.g., if the land-use code is missing from the parcel data and/or the land-use code is mislabeled in the parcel data) or can obtain the land-use code from the parcel data associated with the parcel (e.g., can identify the name from a land-use code field in the parcel data, such as when the land-use code is present or labeled correctly in the parcel data). For example, the parcel growth prediction model trainer 122 or other model trainer can obtain training data corresponding to one or more parcels, where each element in the training data corresponds to a legal description of a respective parcel that is represented by a vector, and where each element in the vector corresponds to a portion of the text of the legal description (e.g., a separate word or phrase in the legal description). Some or all of the vector elements may be labeled with an indication of whether the respective vector element is or is not a land-use code. Alternatively, some or all of the elements in the training data may be labeled with an indication of whether the respective element includes or does not include a land-use code. The parcel growth prediction model trainer 122 or other model trainer can then train a legal description classifier for a geographic area using the training data corresponding to one or more parcels in the geographic area, where the legal description classifier may be trained to output an indication of a correct land-use code for a parcel. The parcel growth prediction model trainer 122 or other model trainer may train one or more legal description classifiers that are each associated with a particular geographic area.

Before, during, and/or after identifying a subdivision name associated with a parcel, the parcel graph model generator 121 can determine a land-use code for the parcel. If using a trained legal description classifier to determine a land-use code for the parcel, the parcel graph model generator 121 can obtain a legal description of the parcel from the parcel data, can convert the text of the legal description into a vector (e.g., where each element of the vector corresponds to a word or phrase in the legal description), and can apply the vector as an input to the trained legal description classifier. The trained legal description classifier may then output a land-use code.

Optionally, the parcel graph model generator 121 may update the parcel data to reflect the land-use code outputted by the trained legal description classifier. The parcel graph model generator 121 can also update the parcel data to reflect the subdivision name outputted by the subdivision name extraction machine learning model and/or the subdivision name classifier. Thus, the parcel graph model generator 121 can clean or correct parcel data corresponding to one or more parcels (e.g., residential parcels, vacant parcels, commercial parcels, industrial parcels, etc.).

The parcel graph model generator 121 can use the geographic boundaries of the parcels, the likely subdivision names, and/or the land-use codes to form a graph model. For example, the parcel graph model generator 121 can generate a polygon for each parcel based on the geographic boundary of the respective parcel. The parcel graph model generator 121 can identify one or more parcels that share the same subdivision name, and optionally enlarge a size of the polygon(s) associated with these parcels (e.g., by 1%, 5%, 10%, etc.), such as by applying a buffer algorithm to the polygon(s). Thus, the parcel graph model generator 121 may identify one or more sets of parcels, where each parcel in a set shares the same subdivision name and/or the same land-use code. For each parcel set, the parcel graph model generator 121 can merge the optionally-enlarged polygons corresponding to the parcels in the respective set to form a merged polygon. Thus, the parcel graph model generator 121 may form one or more merged polygons, one for each set of parcels that share the same subdivision name and/or the same land-use code. Each merged polygon may be a polygon that represents the geographic boundaries of an original parcel (e.g., a parcel as it was prior to the parcel being subdivided to form the currently existing parcels).

The parcel graph model generator 121 may associate each original parcel or merged polygon with a development year, which the parcel graph model generator 121 can derive from the parcel data. For example, the parcel graph model generator 121 may set the development year of an original parcel or merged polygon to be equal to the earliest date on which a structure was built (as indicated in the parcel data) on any parcel that is represented by a polygon that was merged to form the merged polygon.

The parcel graph model generator 121 may also determine a centroid of each merged polygon and any remaining unmerged polygon, which may represent a node in a graph model. The parcel graph model generator 121 can determine which nodes to connect in the graph model based on the merged polygons. For example, the parcel graph model generator 121 can optionally enlarge a size of the merged polygons (e.g., if the polygons of the individual parcels that were merged to form the merged polygon were not previously enlarged) and/or any remaining unmerged polygons (e.g., by applying a buffer algorithm to the merged and/or remaining unmerged polygons) and determine which optionally-enlarged merged and/or unmerged polygons have a boundary that at least partially overlaps or intersects. For any pair of optionally-enlarged merged and/or unmerged polygons that have a boundary that at least partially overlaps or intersects, the parcel graph model generator 121 can insert a link or connection between the nodes that represent the centroids of the optionally-enlarged merged and/or unmerged polygons that form the pair. Thus, the parcel graph model generator 121 can form a graph model that includes one or more nodes, at least some of which are connected to at least one other node in the graph model.

Alternatively, instead of enlarging a polygon, the parcel graph model generator 121 can use another technique for identifying polygons to be merged or to be connected with each other. For example, the parcel graph model generator 121 can use a nearest neighbor operation to merge a first polygon with a second polygon that has geographic coordinates that are closest of all other polygons to the first polygon (e.g., merge a first polygon with a second polygon that has a centroid that has geographic coordinates that are the closest of all other polygons to the centroid of the first polygon), where the first and second polygons share the same subdivision name and/or land-use code. As another example, the parcel graph model generator 121 can use a topology operation to identify neighbor polygons of some or all of the polygons (e.g., where a first polygon neighbors a second polygon if both polygons share at least some coordinates (e.g., each polygon has an edge or line segment with the same coordinates)), and can merge a first polygon with a polygon that neighbors the first polygon if both polygons share the same subdivision name and/or land-use code.

The parcel graph model generator 121 can further associate metadata with each node in the graph model. For example, the metadata can include the development year (as determined in a manner as described above), a lot size (e.g., a size of the original parcel), a land use type of the original parcel, percentage of land growth in the past in the original parcel (which may be derived from the development year and lot size values, such as by determining the development year of sub-parcels corresponding to the node and determining the percentage of sub-parcels corresponding to the node that have a development year prior to or on a certain date), job and employment density in the original parcel or geographic area in which the original parcel resides, population growth in the original parcel or geographic area in which the original parcel resides, household percent growth in the original parcel or a geographic area in which the original parcel resides, distribution of income growth in the original parcel or in a geographic area in which the original parcel resides, average distance to work for residents in the original parcel or in a geographic area in which the original parcel resides, land slope of the original parcel, soil type in the original parcel, distance to a major road from the original parcel, distance to a central business center from the original parcel, distance to a working center from the original parcel, distance to a lake, river, or other body of water from the original parcel, and/or the like. The parcel graph model generator 121 can store the graph model in the model data store 125 in association with a particular geographic area.

When formed, the structure of the graph model may be static (e.g., the nodes and links that form the graph model may remain unchanged during a model training, model testing, and/or model usage period). However, the nodes of the graph model may indicate, for example, a year in which various original parcels were developed. The parcel growth prediction system 120 can generate various versions of the graph model each associated with a particular year or time period in which the structure of the graph model remains static, but a state of the graph model is updated to reflect a particular year or time period. For example, a state of a node can be set to reflect whether the corresponding original parcel has been developed as of a certain date (e.g., the state of a node can be 1 if the original parcel was developed prior to the selected date (e.g., within 5 years prior to the selected date, within 10 years prior to the selected date, etc.), and can be 0 if the original parcel has not been developed as of the selected date (e.g., is vacant) and/or was developed well before the selected date (e.g., 50 years before the selected date, 100 years before the selected date, etc.)). Additional details of how different versions of the graph model are formed and how different versions of the graph model are used are described in greater detail below.

Not only may the parcel growth prediction model trainer 122 train a subdivision name extraction machine learning model and/or a subdivision name classifier, but the parcel growth prediction model trainer 122 may also train a parcel growth artificial intelligence model (e.g., a parcel growth machine learning model) that predicts a probability that a certain parcel or a certain set of parcels are likely to be developed. For example, the parcel growth prediction model trainer 122 can obtain training data that includes, for one or more geographic areas, a version of the graph model corresponding to the respective geographic area that is associated with a particular year or time period. In particular, the parcel growth prediction model trainer 122 can set a training time period (e.g., between a first year and a second year, where both years are prior to a current year) and can generate one or more versions of the graph model corresponding to a particular geographic area. Each version of the graph model may be associated with a year within the training time period. The parcel growth prediction model trainer 122 can generate the graph model by updating a state of each node in the graph model to reflect whether the parcel corresponding to the respective node was developed within the last N years (e.g., 1 year, 5 years, 10 years, etc.) or whether the parcel corresponding to the respective node was not developed within the last N years and/or is vacant, where the state may be a "1" or "developed" state if the parcel was developed within the last N years and may be a "0" or "undeveloped" state if the parcel was not developed within the last N years and/or is vacant. As described herein, the parcel growth prediction model trainer 122 can determine the appropriate state for each node based on the metadata (e.g., development year data) associated with each node in the graph model. Thus, the parcel growth prediction model trainer 122 can generate training data that includes one or more graph models that are each associated with a different geographic area and/or one or more versions of each graph model that are each associated with a particular year. The training data corresponding to a particular geographic area may further include one or more versions of a graph model corresponding to the geographic area that collectively indicate a progression of parcel growth within the first time period. The parcel growth prediction model trainer 122 can then train a parcel growth machine learning model using this training data.

Once trained, the parcel growth prediction model trainer 122 can validate the trained parcel growth machine learning model. For example, the parcel growth prediction model trainer 122 can define a second time period (e.g., between the second year and a third year, where both years are prior to a current year) and generate different versions of one or more graph models that correspond to a year within the second time period, in a manner as described above with respect to the training. The parcel growth prediction model trainer 122 can then apply some or all of these graph model(s) as input(s) to the trained parcel growth machine learning model, which may result in the trained parcel growth machine learning model outputting, for each input, a probability that one or more parcels corresponding to one or more nodes in the graph model(s) is likely to be developed. Optionally, the parcel growth prediction model trainer 122 can annotate the input(s) to indicate a particular node (e.g., a particular parcel) or a particular set of nodes (e.g., a particular set of parcels) for which a probability is desired, and the trained parcel growth machine learning model can output a probability for the indicated node(s) and/or parcel(s) as a result.

The parcel growth prediction model trainer 122 can convert the outputted probability(ies) into growth prediction(s), and can compare the growth prediction(s) with historical data. For example, the parcel growth prediction model trainer 122 can use population data to determine average, historical population growth in a geographic area corresponding to a graph model provided as an input to the trained parcel growth machine learning model, such as average population growth in the geographic area over a previous period of time (e.g., last 5 years, last 10 years, etc.). The parcel growth prediction model trainer 122 can then estimate the population growth in the geographic area in a future year to be equal to the average, historical population growth in the geographic area. Based on the estimated future population growth in the geographic area, the parcel growth prediction model trainer 122 can determine how many parcels in the geographic area may be subdivided and/or converted into multi-story structures in a year to support the average population growth. In addition, the parcel growth prediction model trainer 122 can rank or order the parcels in a geographic area for which a probability is outputted by the trained parcel growth machine learning model by the outputted probability value. The parcel growth prediction model trainer 122 can then traverse the ranked or ordered parcels and determine that the M highest ranked or ordered parcels (where M equals the determined number of parcels that may be subdivided and/or converted into multi-story structures in a year) have a high growth prediction (e.g., 100%) of being developed in a first year in the second time period. The parcel growth prediction model trainer 122 can then repeat these operations for one or more subsequent years in the second time period, traversing the ranked or ordered parcels to identify the next number of parcels that may be developed in subsequent year(s) in the second time period. If the parcel growth prediction model trainer 122 reaches the end of the second time period and determines that one or more parcels may still not be developed, then the growth prediction for such parcels may be set to a low value (e.g., 0%, 0.1%, 1%, etc.). Thus, the parcel growth prediction model trainer 122 can determine a growth prediction for each parcel in a geographic area, year by year for some or all of the years in the second time period. The parcel growth prediction model trainer 122 can further repeat these operations for one or more geographic areas and/or graph models.

Because the growth predictions may be determined for year(s) in the second time period, which falls prior to a current year, the parcel growth prediction model trainer 122 can also obtain historical data (e.g., node metadata) that indicates year(s) in which parcels were actually developed, if at all. The parcel growth prediction model trainer 122 can compare the historical data to the determined growth predictions, and determine an error rate of the trained parcel growth machine learning model based on the comparison. If the error rate is greater than a threshold value (e.g., 5%, 10%, etc.), the parcel growth prediction model trainer 122 may re-train the parcel growth machine learning model using different training data, training data corresponding to a time period other than the first time period, and/different hyperparameter(s), repeating such operations until the error rate is below the threshold value. Once training and validation is complete, the parcel growth prediction model trainer 122 can store the trained parcel growth machine learning model in the model data store 125.

The parcel growth prediction model trainer 122 can train one or more parcel growth machine learning models, such as an individual parcel growth machine learning model for all geographic areas, for each geographic area, or for each set of geographic areas. The parcel growth prediction model trainer 122 can store each trained parcel growth machine learning model in the model data store 125 in association with a particular geographic area or set of geographic areas.

The parcel growth predictor 123 can use a trained parcel growth machine learning model to determine a growth prediction for one or more parcels in a geographic area, such as a growth prediction for one or more years in the future. For example, a user device 102 can transmit to the parcel growth prediction system 120 (e.g., the parcel growth predictor 123) a request for the likelihood that a particular parcel or a particular set of parcels in a geographic area are likely to be developed within a certain time period (e.g., in the next 1 year, 3 years, 5 years, etc.). In response, the parcel growth predictor 123 can obtain from the model data store 125 a copy of a graph model corresponding to the requested geographic area and a trained parcel growth machine learning model corresponding to the requested geographic area. The parcel growth predictor 123 can then update a status of one or more nodes of the graph model to reflect a current development state for each parcel corresponding to the nodes. For example, the parcel growth predictor 123 can parse the metadata associated with each node in the graph model and update a status of the respective node (e.g., update a status field in the metadata associated with the respective node) to be a "1" or "developed" state if the metadata (e.g., development year) indicates that a parcel corresponding to the respective node was developed within the last N years of a current year and may be a "0" or "undeveloped" state if the metadata (e.g., development year) indicates that a parcel corresponding to the respective node was not developed within the last N years of a current year and/or is vacant. The parcel growth predictor 123 can then apply the graph model with the updated status and an indication of a parcel for which likelihood of development information is requested as an input to the trained parcel growth machine learning model, which causes the trained parcel growth machine learning model to output a probability of development for the requested parcel. If likelihood of development information is requested for multiple parcels, then the parcel growth predictor 123 can execute the trained parcel growth machine learning model multiple times, where each execution includes applying the graph model with the updated status and an indication of one of the requested parcels as an input to the model. Thus, the parcel growth predictor 123 may receive multiple probabilities of developments from the trained parcel growth machine learning model, one for each requested parcel. In further embodiments, the parcel growth predictor 123 can execute the trained parcel growth machine learning model for one or more other parcels in the geographic area that were not requested, such as for parcels in the geographic area that have not been developed within the last N years of a current year and/or that are vacant.

The parcel growth predictor 123 can use population data to convert the probabilities of development into growth predictions. For example, the parcel growth predictor 123 can obtain population data from the census data store 140. The population data can include historical population figures for a geographic area (e.g., the population of a geographic area over one or more points in time), a population growth rate in a geographic area over a period of time, and/or the like. The parcel growth predictor 123 can process the population data to identify an average population growth in the geographic area (e.g., by comparing historical population figures over a period of time and determining the average change in population figures over the period of time, by averaging the population growth rates over the period of time, etc.), which the parcel growth predictor 123 may assume will be the average population growth in the geographic area in the future. Generally, a parcel having a given lot size may be able to support or accommodate Y individuals (e.g., provide a minimum amount of space for the Y individuals such that the Y individuals all have access to food and shelter). In other words, one individual may be supported or accommodated by a certain portion of a lot size (e.g., a particular square footage). The parcel growth predictor 123 may include data indicating how much square footage is sufficient to accommodate or support one individual (or data indicating how many individuals can be supported or accommodated given a particular lot size), and can use this data along with parcel lot sizes to determine how many vacant or underdeveloped parcels may be developed in the next year (or in the next 3 years, the next 5 years, etc.) to accommodate or support the estimated average population growth in the geographic area in the next year (or in the next 3 years, the next 5 years, etc.).

The parcel growth predictor 123 can rank or order the parcel(s) for which probabilities of development have been determined by the probabilities, and can determine the number of parcels that may be developed in the next year (or in the next 3 years, the next 5 years, etc.) by traversing the ranking or ordering from highest probability to lowest probability, and for each parcel, determining the lot size of the respective parcel, determining how many individuals can be supported by the lot size of the respective parcel, determining whether the respective parcel together with parcels already traversed collectively can support the expected population growth (e.g., where the expected population growth may be an integer that is determined by the parcel growth predictor 123 by taking the current population of the geographic area, estimating a new population of the geographic area given the average population growth in the geographic area, and determining a difference between the new population and the current population), continuing to traverse the ranking or ordering if it is determined that the respective parcel together with parcels already traversed collectively cannot support the expected population growth, and ceasing to traverse the ranking or ordering if it is determined that the respective parcel together with parcels already traversed collectively can support the expected population growth. Thus, the parcel growth predictor 123 may identify which parcel(s) are likely to be developed within the time period to accommodate the average population growth, and can set growth predictions for these parcels to be near or at 100% for the time period (e.g., 90%, 95%, etc., where the value may be high, but weighted based on the probabilities output by the trained parcel growth machine learning model). For those parcels that the parcel growth predictor 123 may identify are less likely to be developed within the time period (e.g., these parcels were not traversed in the ranking or ordering), the parcel growth predictor 123 can set growth predictions for these parcels to be near or at 0% for the time period (e.g., 5%, 10%, etc., where the value may be low, but weighted based on the probabilities output by the trained parcel growth machine learning model).

The parcel growth predictor 123 can repeat the growth prediction determinations for one or more time periods using the same ranking or ordering. For example, after determining growth predictions for a first time period in a manner as described above, the parcel growth predictor 123 can use the population data to determine an expected population growth by the end of a second time period that follows the first time period, and perform a similar traversal of the ranking or ordering to identify which parcels are sufficient to support the expected population growth by the end of the second time period. As an illustrative example, the parcel growth predictor 123 can initially determine growth predictions for 1 year from a current year. Subsequently. The parcel growth predictor 123 can determine growth predictions for 3 years from the current year. When determining growth predictions for 3 years from the current year, the parcel growth predictor 123 may assume that the parcels identified as likely being developed within 1 year from the current year have been developed, and may start traversing the ranking or ordering from the parcel that was last traversed when determining the growth predictions for 1 year from the current year.

The user interface generator 124 can generate one or more visualizations of the growth predictions. For example, the user interface generator 124 can generate user interface data that, when processed by a user device 102, causes the user device 102 to display a user interface in which the growth predictions are presented in a table format. In particular, the depicted table may identify, in each row, a parcel, the growth prediction for one or more time periods (e.g., 1 year from a current year, 3 years from a current year, 5 years from a current year, etc.), and/or any other information associated with the parcel. As another example, the user interface generator 124 can generate user interface data that, when processed by a user device 102, causes the user device 102 to display a user interface that includes a geographic map that depicts the location of various parcels in a geographic area covered by the geographic map. Each parcel may have a particular color or shading that indicates whether the respective parcel was previously developed (e.g., within the last N years of a current year), whether the respective parcel is likely to be developed within the next M years (e.g., where the growth prediction value may be displayed, and the colors or shading may vary based on whether the growth prediction value is high (e.g., greater than 75%), medium (e.g., between 25% and 75%), or low (e.g., less than 25%)), and/or whether the respective parcel is vacant or has not been developed within the last N years. The user interface may further include a time slider that allows a user to select different time periods in the future (e.g., 1 year from a current year, 3 years from a current year, 5 years from a current year, etc.). As a user slides the time slider to select a new time period, the geographic map may be automatically updated to reflect the likely development of a parcel within the selected time period and/or to reflect growth predictions for the selected time period.

The model data store 125 may store one or more graph models, one or more subdivision name extraction machine learning models, one or more subdivision name classifiers, one or more trained parcel growth machine learning models, and/or the like. While the model data store 125 is depicted as being internal to the parcel growth prediction system 120, this is not meant to be limiting. For example, the model data store 125 can be located external to the parcel growth prediction system 120.

The parcel data store 130 may store parcel data for one or more parcels in one or more geographic areas. While the parcel data store 130 is depicted as being external to the parcel growth prediction system 120, this is not meant to be limiting. For example, the parcel data store 130 can be internal to the parcel growth prediction system 120.

The census data store 140 may store population data for one or more geographic areas. While the census data store 140 is depicted as being external to the parcel growth prediction system 120, this is not meant to be limiting. For example, the census data store 140 can be internal to the parcel growth prediction system 120.

Example Block Diagram for Determining a Growth Prediction for a Parcel

Figure 2:
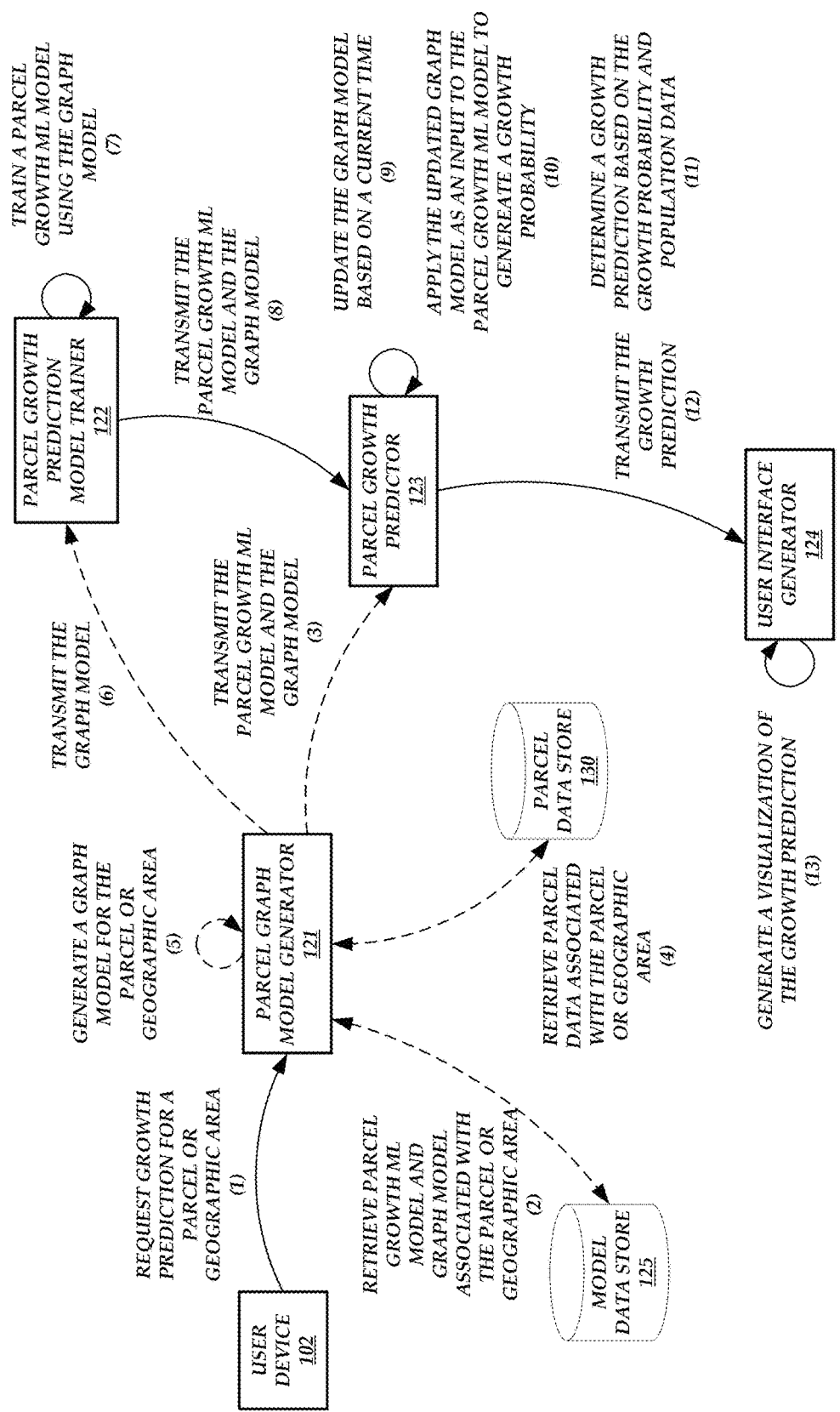
FIG. 2 is a flow diagram illustrating the operations performed by the components of the operating environment of FIG. 1 to determine a growth prediction for a parcel.

FIG. 2 is a flow diagram illustrating the operations performed by the components of the operating environment 100 of FIG. 1 to determine a growth prediction for a parcel. As illustrated in FIG. 2, a user device 102 may request a growth prediction for a parcel or a geographic area at (1).

The parcel graph model generator 121 (or the parcel growth predictor 123) may receive the request from the user device 102. In response to the request or at some time prior to the request being received, the parcel graph model generator 121 can retrieve a parcel growth machine learning model and a graph model associated with the parcel or geographic area from the model data store 125 at (2), if the parcel growth machine learning model has already been trained by the parcel growth prediction model trainer 122 and if the graph model has already been generated by the parcel graph model generator 121. The parcel graph model generator 121 can then transmit the parcel growth machine learning model and the graph model to the parcel growth predictor 123 at (3). Alternatively, the parcel growth predictor 123 can retrieve the parcel growth machine learning model and the graph model from the model data store 125 in response to the request instead of the parcel graph model generator 121.

If the parcel growth machine learning model has not yet been trained and/or the graph model has not yet been generated at the time that the request is received, then the parcel graph model generator 121 can retrieve parcel data associated with the parcel or geographic area from the parcel data store 130 at (4). The parcel graph model generator 121 can then use the parcel data to generate a graph model for the parcel or the geographic area at (5) in a manner as described herein. For example, the parcel graph model generator 121 can generate polygons for individual parcels in the geographic area, enlarge a size of some or all of the polygons, use a trained subdivision name extraction machine learning model and/or a subdivision name classifier to identify parcels that share a subdivision name, merge the polygons of parcels that share the same subdivision name to form one or more merged polygons, identify a centroid of the merged polygons and any remaining unmerged polygons, and connect the centroids of the merged and/or unmerged polygons that have boundaries that at least partially overlap. As another example, the parcel graph model generator 121 can generate polygons for individual parcels in the geographic area, use a trained subdivision name extraction machine learning model and/or a subdivision name classifier to identify parcels that share a subdivision name, merge the polygons of parcels that share the same subdivision name to form one or more merged polygons, enlarge a size of some or all of the merged polygons and any remaining unmerged polygons, identify a centroid of the merged polygons and any remaining unmerged polygons, and connect the centroids of the merged and/or unmerged polygons that have boundaries that at least partially overlap. The parcel graph model generator 121 can then transmit the graph model to the parcel growth prediction model trainer 122 at (6).

The parcel growth prediction model trainer 122 can train a parcel growth machine learning model using the graph model at (7). For example, the parcel growth prediction model trainer 122 can generate one or more versions of the graph model that each reflect the development state of parcels represented by the graph model at a particular point in time (e.g., within a first time period), and use these versions as the training data for training the parcel growth machine learning model. The parcel growth prediction model trainer 122 can further validate the trained parcel growth machine learning model using one or more second versions of the graph model that each reflect the development state of parcels represented by the graph model at a particular second point in time (e.g., within a second time period after the first time period, but before a current year or time period). The parcel growth prediction model trainer 122 may optionally re-train or update the parcel growth machine learning model based on the results of the validation. The parcel growth prediction model trainer 122 can then transmit the parcel growth machine learning model and the graph model to the parcel growth predictor 123 at (8).

The parcel growth predictor 123 can update the graph model based on a current time at (9). For example, the parcel growth predictor 123 can update one or more nodes of the graph model to have a state that represents a current development state of the parcels represented by the nodes (e.g., where the state can be a developed state (e.g., a "1"), a vacant state (e.g., "0"), an undeveloped state (e.g., the parcel has not been developed within the last N years, which may be represented by a "0"), etc.). Once updated, the parcel growth predictor 123 can apply the updated graph model as an input to the parcel growth machine learning model to generate a growth probability (e.g., also referred to herein as a probability of development, development probability, or growth probability) for one or more parcels at (10). The parcel growth predictor 123 can then obtain population data and determine a growth prediction for one or more parcels based on the growth probability and the population data at (11). Optionally, the parcel growth predictor 123 can repeat operation (11) to determine growth predictions for multiple time periods. The parcel growth predictor 123 can transmit the growth prediction(s) to the user interface generator 124 at (12).

The user interface generator 124 can generate a visualization of the growth prediction(s) at (13). For example, the visualization can be a user interface that includes a table that depicts the growth prediction(s), a geographic map that depicts parcels and corresponding growth prediction(s), and/or the like.

Example Graph Model Generation

Figure 3A:
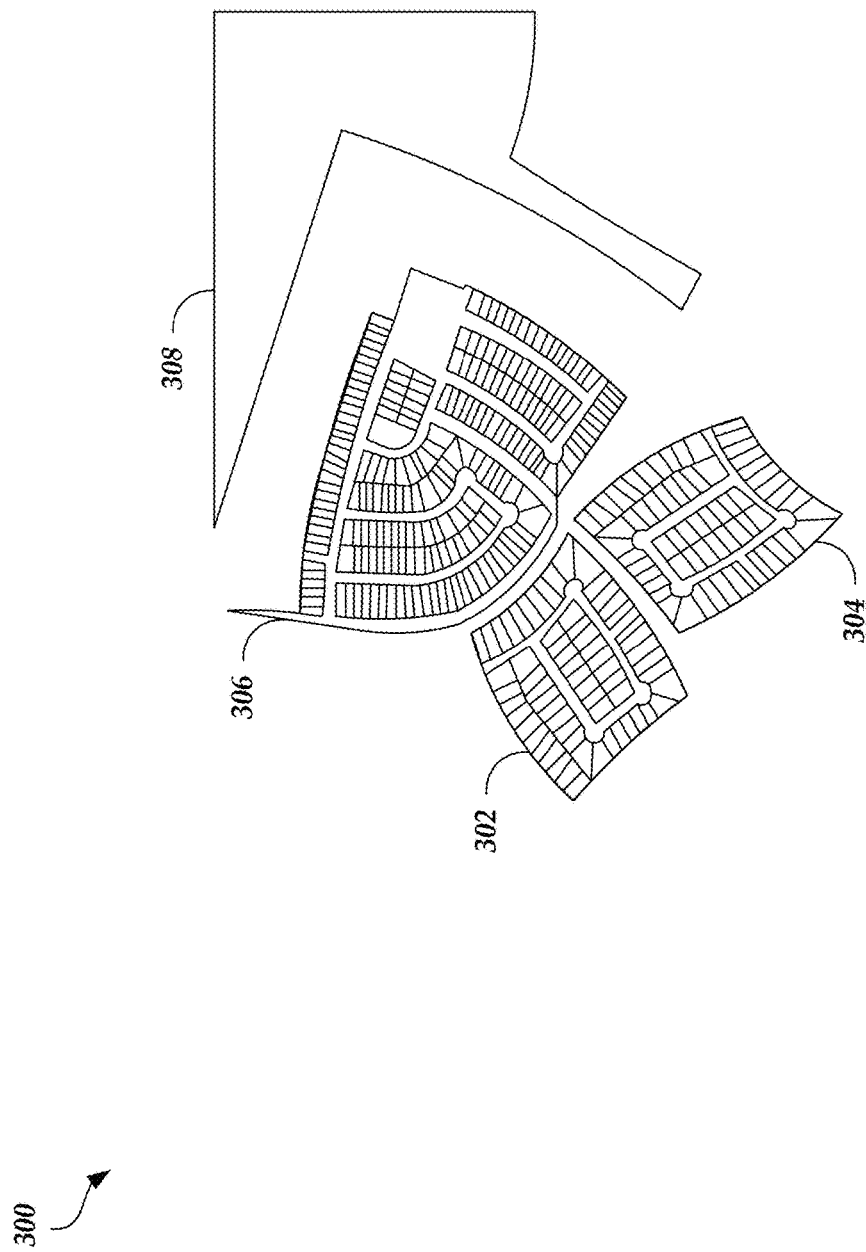
FIGS. 3A-3D illustrate an example diagram that visually depicts operations that may be performed by the parcel graph model generator to generate a graph model.

FIGS. 3A-3D illustrate an example diagram 300 that visually depicts operations that may be performed by the parcel graph model generator 121 to generate a graph model. For example, the diagram 300 may include a geographic map of a set of parcels defined by subdivision 302, subdivision 304, subdivision 306, and vacant lot 308, as illustrated in FIG. 3A. The parcels depicted in the geographic map may be the parcels present at a current time.

Figure 3B:
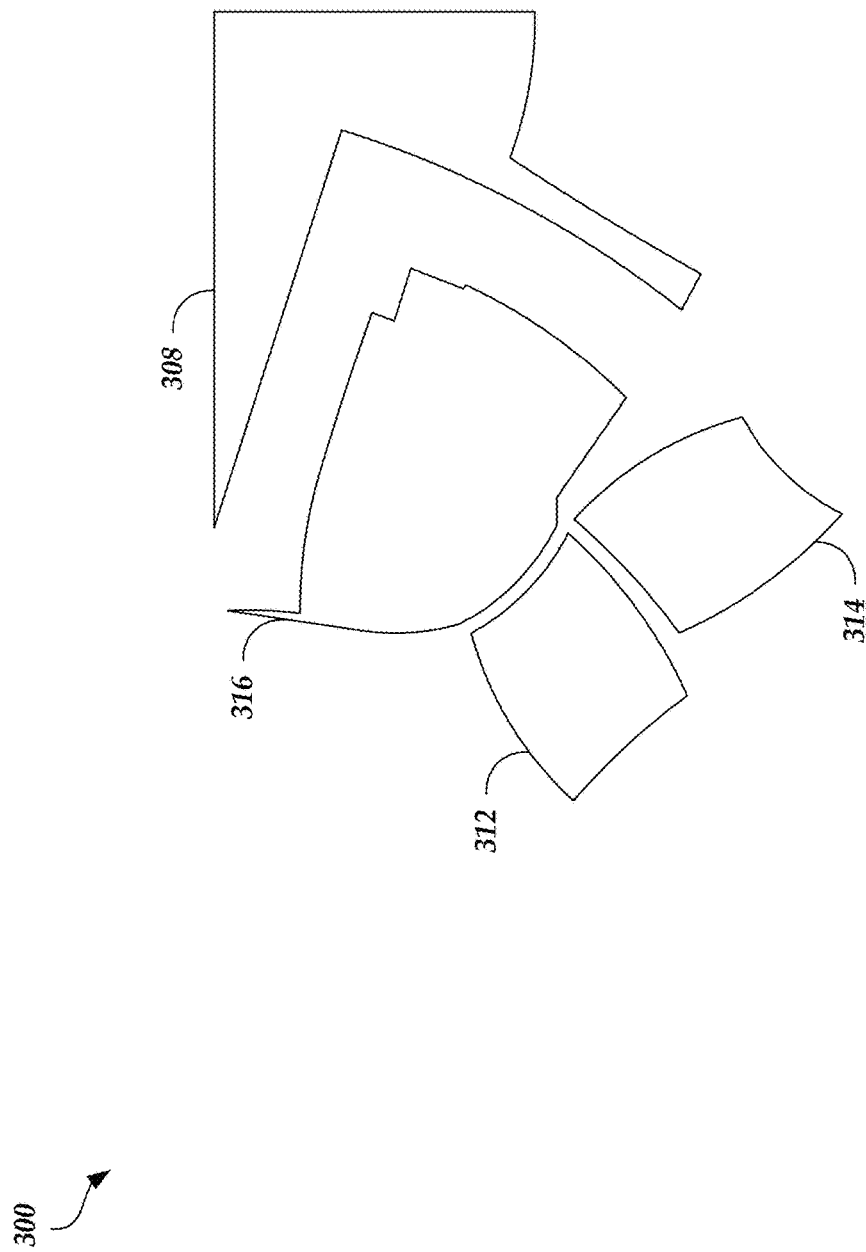

As illustrated in FIG. 3B, the parcel graph model generator 121 has identified individual parcels depicted in the diagram 300 in FIG. 3A and has identified those parcels that share the same subdivision name. Specifically, the parcel graph model generator 121 has determined that the parcels depicted within the subdivision 302 share the same subdivision name, the parcels depicted within the subdivision 304 share the same subdivision name, and the parcels depicted within the subdivision 306 share the same subdivision name. As a result, the parcel graph model generator 121 has merged the polygons representing the parcels depicted within the subdivision 302 to form merged polygon 312, has merged the polygons representing the parcels depicted within the subdivision 304 to form merged polygon 314, and has merged the polygons representing the parcels depicted within the subdivision 306 to form merged polygon 316. Optionally, the parcel graph model generator 121 may have enlarged a size of the parcels depicted within the subdivisions 302, 304, and 306 prior to forming the merged polygons 312, 314, and 316. There may be no change to the polygon representing the vacant lot 308 because no parcels were identified that share a same subdivision name within the vacant lot 308.

Figure 3C:
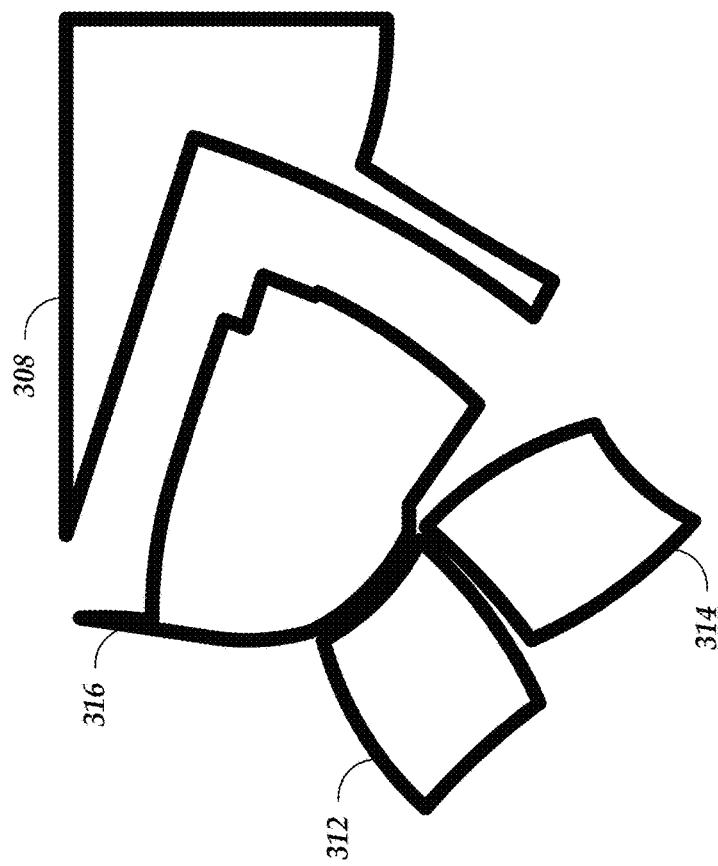

As illustrated in FIG. 3C, the parcel graph model generator 121 has enlarged a size of the merged polygons 312, 314, and 316 and a size of any unmerged polygons (e.g., the polygon representing the vacant lot 308). The parcel graph model generator 121 may enlarge the size of the merged polygons 312, 314, and 316 and/or the size of the any unmerged polygons if the parcel graph model generator 121 did not previously enlarge a size of the polygons representing the parcels depicted within the subdivisions 302, 304, and 306.

Figure 3D:
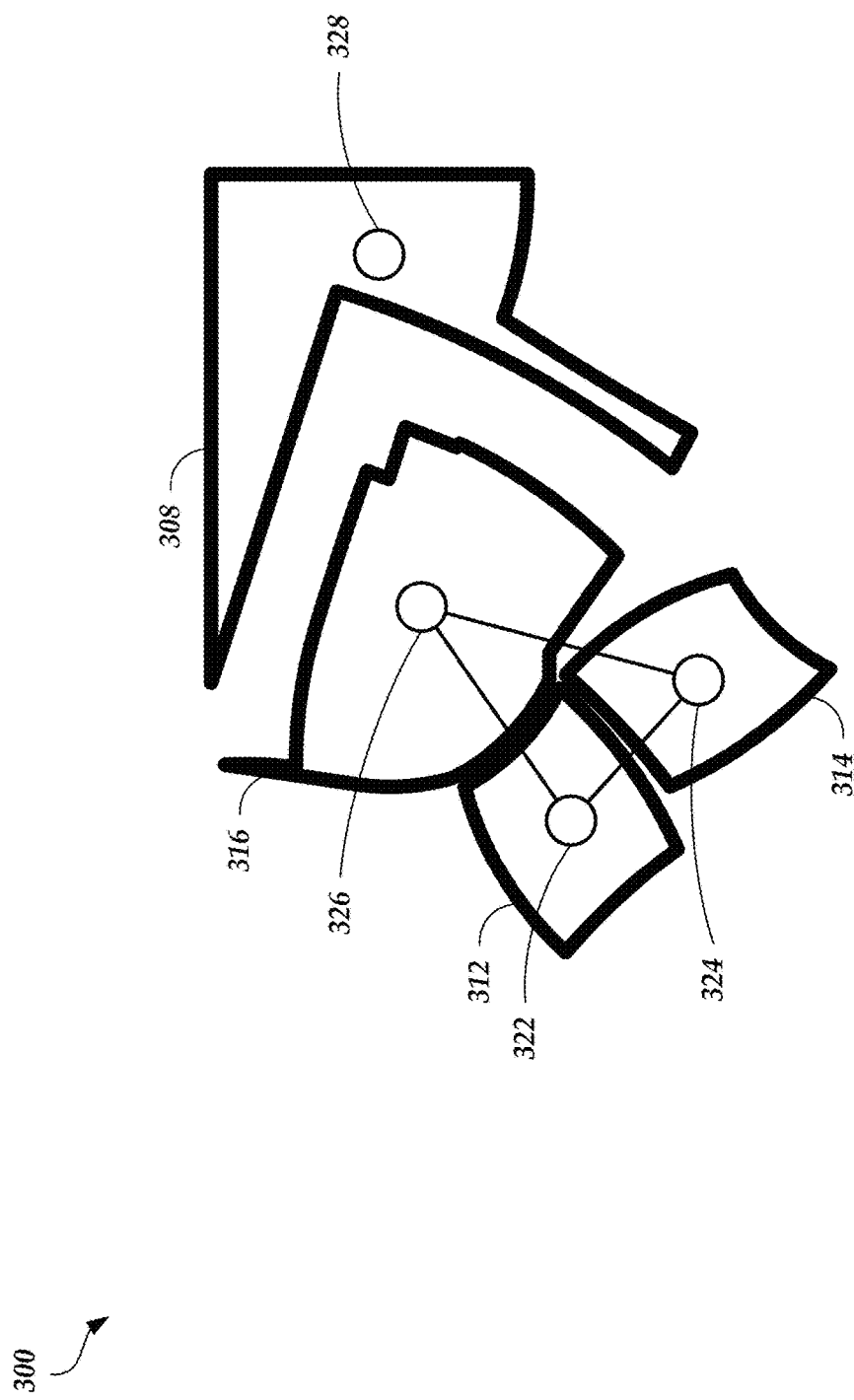

As illustrated in FIG. 3D, the parcel graph model generator 121 has identified a centroid 322 of the merged polygon 312, a centroid 324 of the merged polygon 314, a centroid 326 of the merged polygon 316, and a centroid 328 of the vacant lot 308. Each centroid 322, 324, 326, and 328 may represent a node in the graph model. The parcel graph model generator 121 can then connect those centroids or nodes that reside within overlapping or intersecting polygons. For example, the parcel graph model generator 121 may connect the centroid 322 with the centroid 324 because the merged polygon 312 within which the centroid 322 resides at least partially overlaps or intersects with the merged polygon 314 within which the centroid 324 resides. Similarly, the parcel graph model generator 121 may connect the centroid 326 with the centroid 322 and with the centroid 324 because the merged polygon 316 within which the centroid 326 resides at least partially overlaps or intersects with the merged polygon 312 within which the centroid 322 resides and with the merged polygon 314 within which the centroid 324 resides. The parcel graph model generator 121 may not connect the centroid 328 with any other centroid 322, 324, or 326 depicted in the diagram 300 because none of the corresponding merged polygons 312, 314, or 316 intersects or overlaps with the polygon representing the vacant lot 308.

Example Graph Model

Figure 4A:
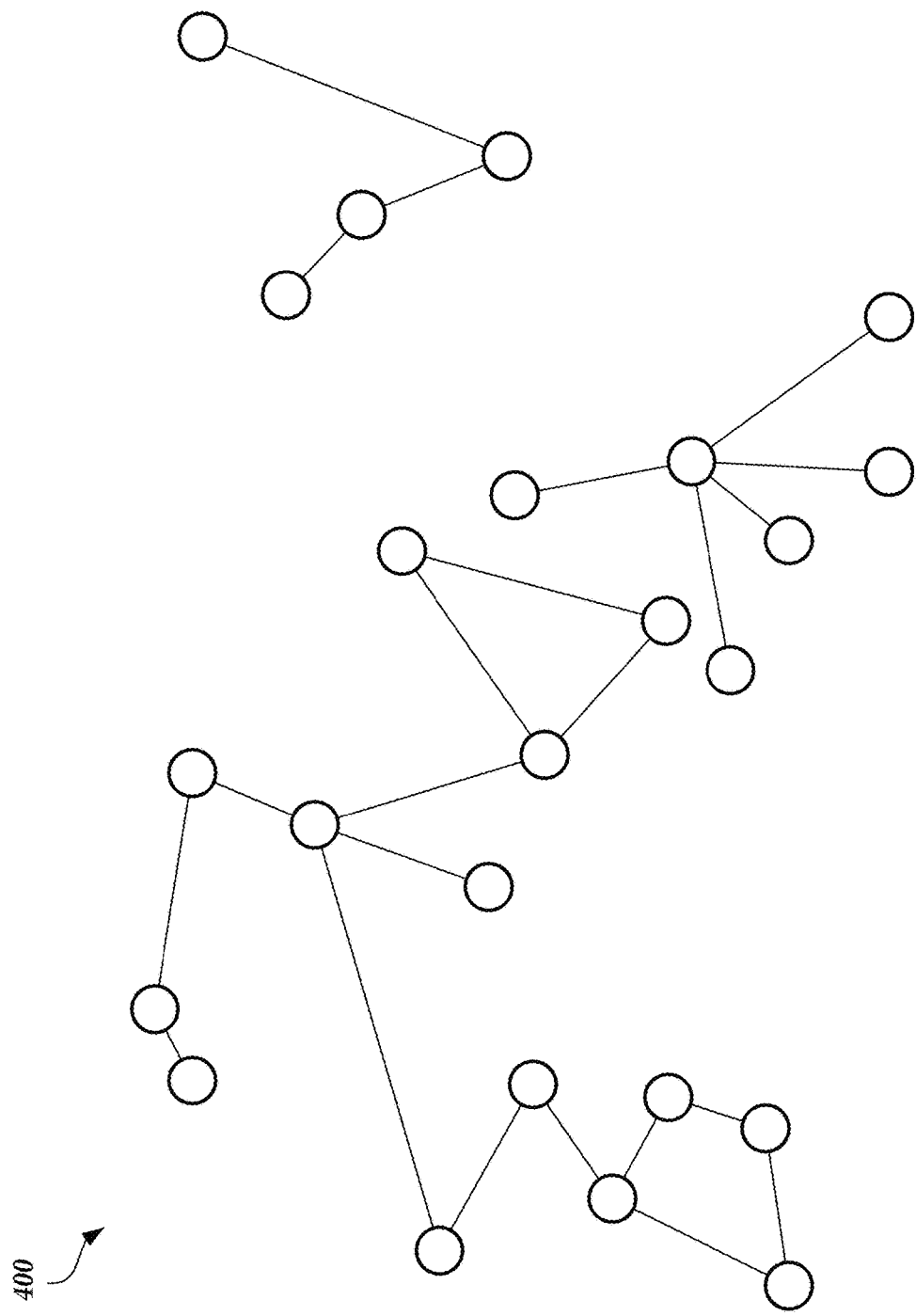
Figure 4B:
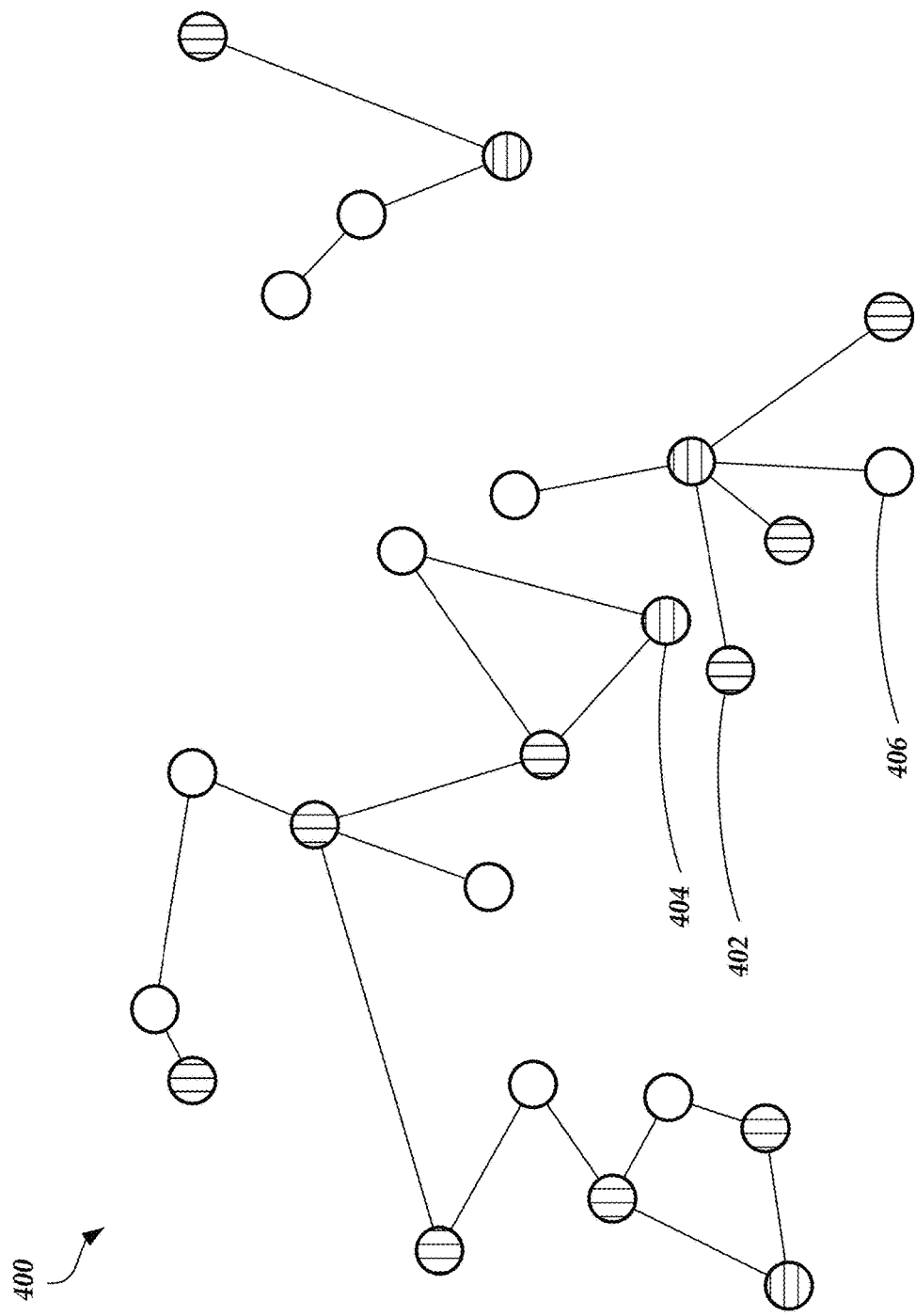

FIGS. 4A-4C illustrate an example graph model 400 generated by the parcel graph model generator 121. The graph model 400 may include various nodes that are interconnected. However, not all nodes may be connected with each other for the reasons discussed herein, as illustrated in FIG. 4A.

FIG. 4A depicts an initial structure of the graph model 400, which may be used for training, validating, and/or using a parcel growth machine learning model. During a first time period (e.g., 2001-2011), some parcels corresponding to the nodes in the graph model 400 may have already been developed within the last N years of the first time period (and shaded, patterned, and/or colored in a first manner), other parcels corresponding to the nodes in the graph model 400 may be developed during the first time period (and shaded, patterned, and/or colored in a second manner) and other parcels corresponding to the nodes in the graph model 400 may be vacant and/or developed before a threshold time of the first time period and remain this way at the end of the first time period (and shaded, patterned, and/or colored in a third manner). A version of the graph model 400 corresponding to the first time period may be used by the parcel growth prediction model trainer 122 to train the parcel growth machine learning model. For example, node 402 and other nodes in the graph model 400 may be depicted with a vertical pattern to indicate that the node 402 and other similar nodes represent parcels that were developed within the last N years of the first time period, node 404 and other nodes in the graph model 400 may be depicted with a horizontal pattern to indicate that the node 404 and other similar nodes represent parcels that were developed during the first time period, and node 406 and other nodes in the graph model 400 may be depicted with no pattern and/or a white color and/or shading to indicate that the node 406 and other similar nodes represent parcels that are vacant and/or still not developed within the last N years of the first time period by the end of the first time period, as illustrated in FIG. 4B.

During a second time period that follows the first time period (e.g., 2011-2021), some parcels corresponding to the nodes in the graph model 400 may have already been developed within the last N years of the second time period (and shaded, patterned, and/or colored in a first manner), other parcels corresponding to the nodes in the graph model 400 may be developed during the second time period (and shaded, patterned, and/or colored in a second manner) and other parcels corresponding to the nodes in the graph model 400 may be vacant and/or developed before a threshold time of the second time period and remain this way at the end of the second time period (and shaded, patterned, and/or colored in a third manner). A version of the graph model 400 corresponding to the second time period may be used by the parcel growth prediction model trainer 122 to validate a trained parcel growth machine learning model. For example, node 402 and other nodes in the graph model 400 may be depicted with a vertical pattern to indicate that the node 402 and other similar nodes represent parcels that were developed within the last N years of the second time period, node 404 and other nodes in the graph model 400 may be depicted with a horizontal pattern to indicate that the node 404 and other similar nodes represent parcels that were developed during the first time period, node 406 and other nodes in the graph model 400 may be depicted with block color and/or shading to indicate that the node 406 and other similar nodes represent parcels that were developed during the second time period, and node 408 and other nodes in the graph model 400 may be depicted with no pattern and/or a white color and/or shading to indicate that the node 408 and other similar nodes represent parcels that are vacant and/or still not developed within the last N years of the second time period by the end of the second time period, as illustrated in FIG. 4C. The parcel growth predictor 123 may use the version of the graph model 400 illustrated in FIG. 4C, optionally updated such that the state of nodes indicate whether development has occurred within the last N years of a current year and/or development has not occurred within the last N years of a current year, to determine growth predictions for one of more of the parcels represented by nodes with no pattern and/or white color and/or shading (e.g., node 408).

Example User Interface

Figure 5A:
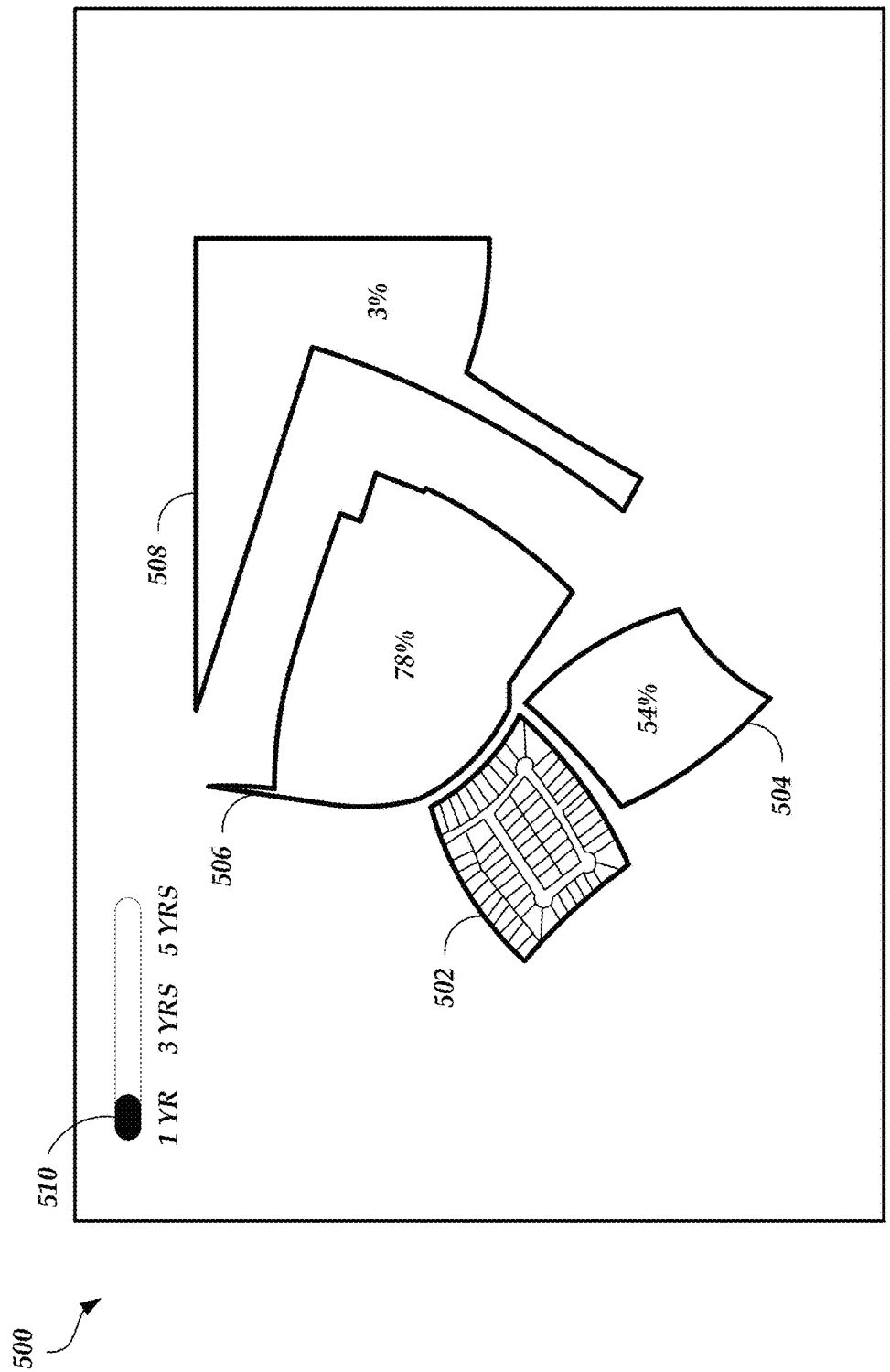
FIGS. 5A-5C illustrate an example user interface that depicts prediction growths derived from outputs of the parcel growth machine learning model.
Figure 5B:
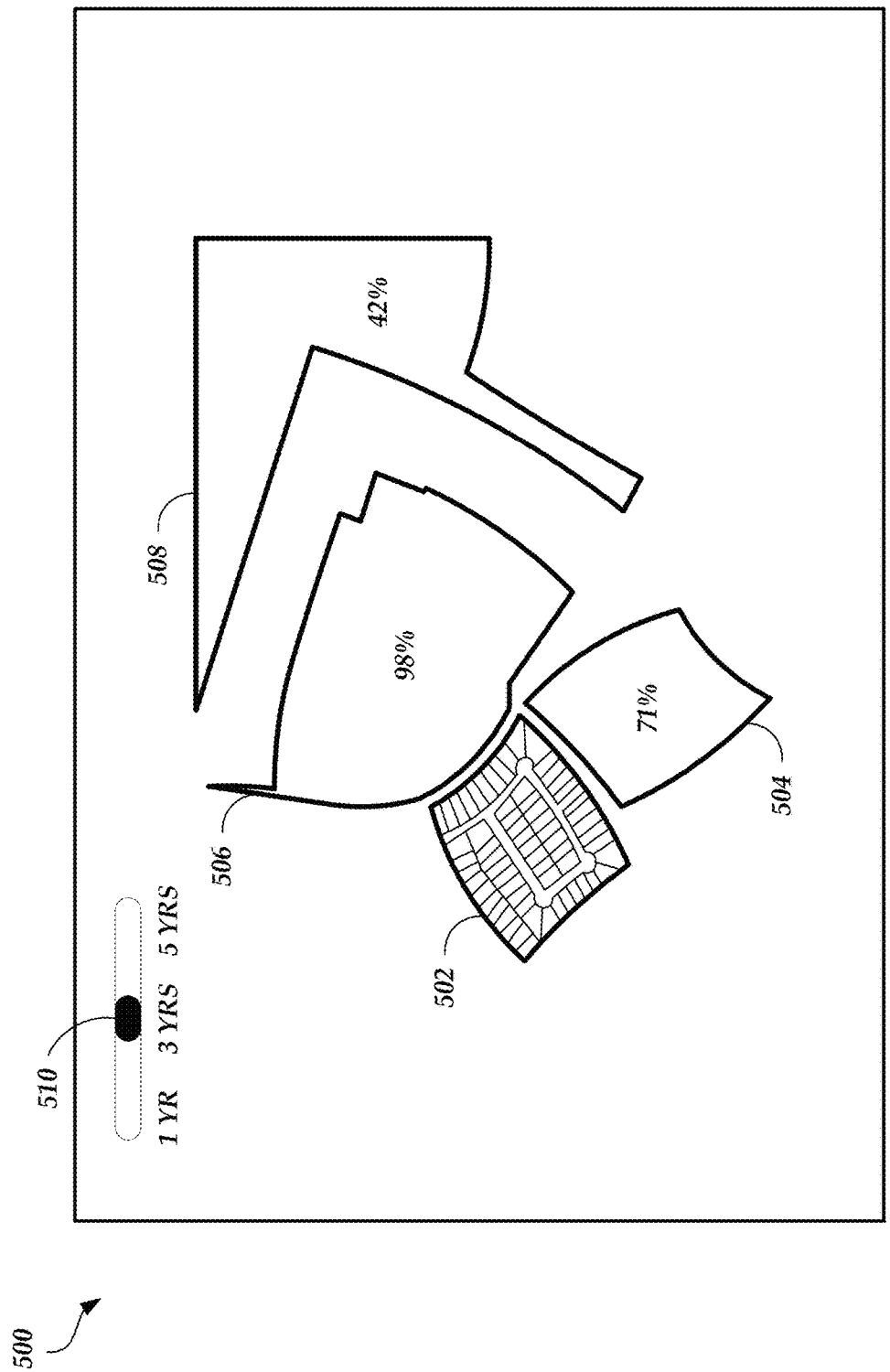
Figure 5C:
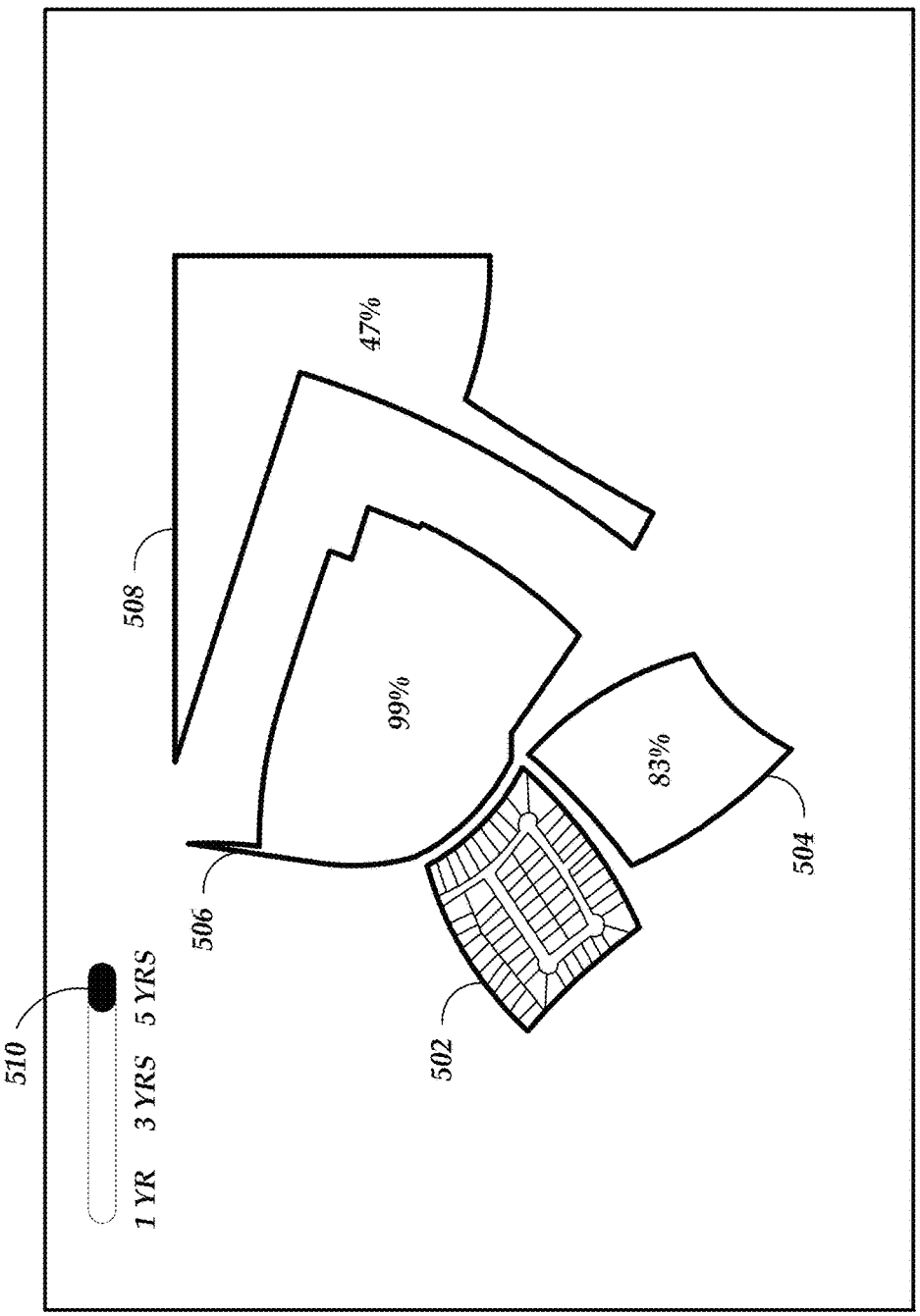

FIGS. 5A-5C illustrate an example user interface 500 that depicts prediction growths derived from outputs of the parcel growth machine learning model. For example, the user interface 500 can be displayed by a user device 102 in response to processing user interface data generated by the user interface generator 124.

As illustrated in FIG. 5A, the user interface 500 may include a depiction of a subdivision 502 and a depiction of vacant lots 504, 506, and 508. The subdivision 502 may have been developed at some time prior to a current time, and the vacant lots 504, 506, and 508 may be vacant as of a current time.

The user interface 500 may further include a time slider 510 that allows a user to view growth predictions for the vacant lots 504, 506, and 508 1 year after a current time, 3 years after a current time, and 5 years after a current time. While the time slider 510 allows the user to select three time periods, this is not meant to be limiting. Growth predictions can be generated for any number of time periods, and the time slider 510 can be adjusted such that the user can select any one of these time periods.

Here, the user has moved the timer slider 510 (or the time slider 510 defaulted) to 1 year after a current time. The parcel growth predictor 123 may have generated growth predictions for the vacant lots 504, 506, and 508 for 1 year from a current time. As a result, the user interface 500 may depict the growth predictions for the vacant lots 504, 506, and 508 for 1 year from a current time, such as within each graphical representation of the vacant lots 504, 506, and 508. For example, the graphical representation of the vacant lot 504 includes an indication that the growth prediction is 54%, the graphical representation of the vacant lot 506 includes an indication that the growth prediction is 78%, and the graphical representation of the vacant lot 508 includes an indication that the growth prediction is 3%. Alternatively, the user interface 500 may display a growth prediction for a vacant lot 504, 506, and/or 508 in the graphical representation or in a pop-up window when a user hovers over or otherwise selects the vacant lot 504, 506, and/or 508.

As illustrated in FIG. 5B, the user has adjusted the time slider 510 to 3 years after a current time. As a result, the growth predictions for the vacant lots 504, 506, and 508 have been adjusted automatically. For example, the graphical representation of the vacant lot 504 includes an indication that the growth prediction is now 71%, the graphical representation of the vacant lot 506 includes an indication that the growth prediction is now 98%, and the graphical representation of the vacant lot 508 includes an indication that the growth prediction is now 42%.

As illustrated in FIG. 5C, the user has adjusted the time slider 510 to 5 years after a current time. As a result, the growth predictions for the vacant lots 504, 506, and 508 have been adjusted automatically again. For example, the graphical representation of the vacant lot 504 includes an indication that the growth prediction is now 83%, the graphical representation of the vacant lot 506 includes an indication that the growth prediction is now 99%, and the graphical representation of the vacant lot 508 includes an indication that the growth prediction is now 47%.

Example Graph Model Generation Routine

Figure 6:
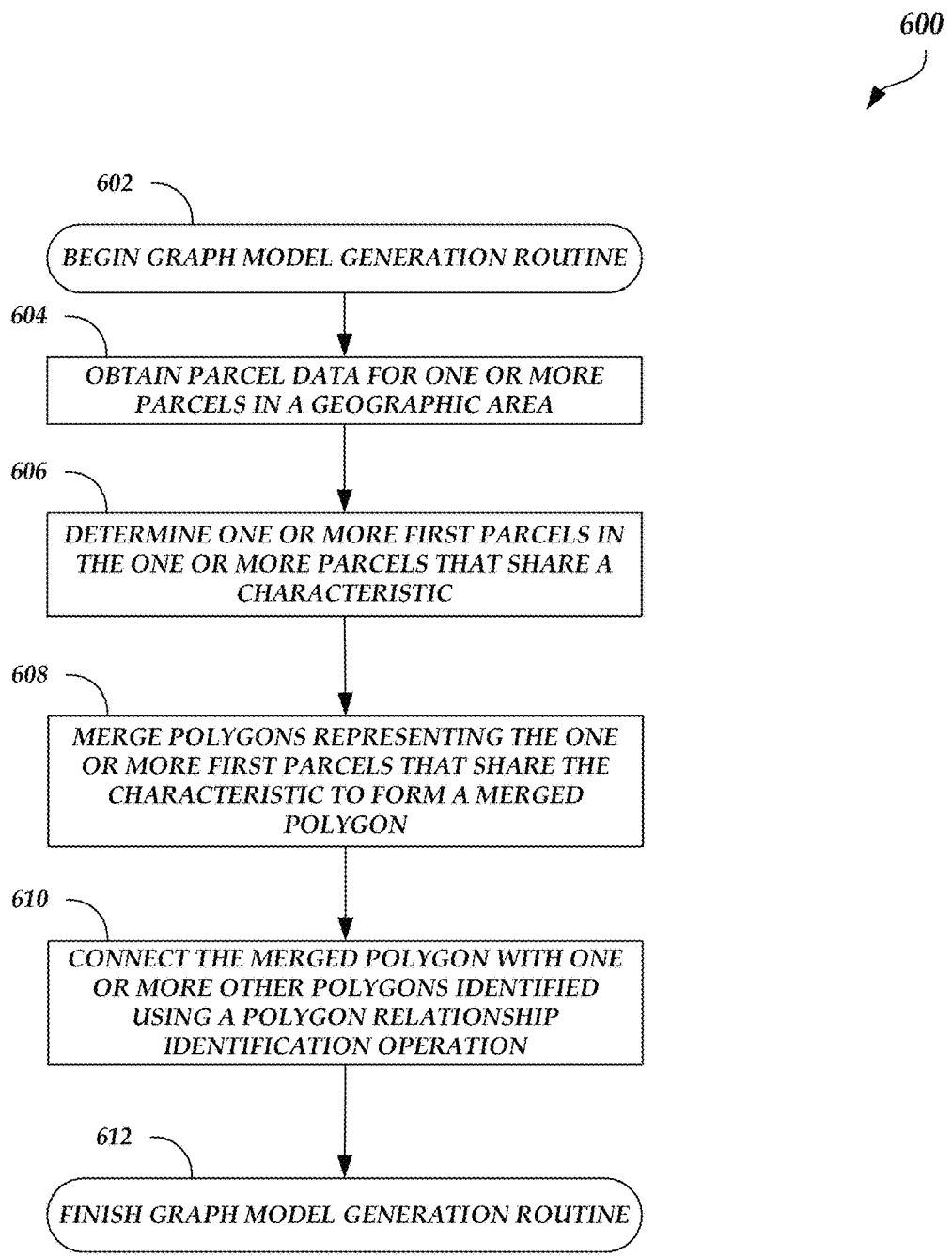
FIG. 6 is a flow diagram depicting an example, graph model generation routine illustratively implemented by a parcel growth prediction system, according to one embodiment.

FIG. 6 is a flow diagram depicting an example, graph model generation routine 600 illustratively implemented by a parcel growth prediction system, according to one embodiment. As an example, the parcel growth prediction system 120 of FIG. 1 (e.g., the parcel graph model generator 121) can be configured to execute the graph model generation routine 600. The graph model generation routine 600 begins at block 602.

At block 604, parcel data for one or more parcels in a geographic area is obtained. The parcel data may include data indicating geographical boundaries of the one or more parcels.

At block 606, one or more first parcels in the one or more parcels that share a characteristic is determined. For example, the shared characteristic may be that each of the one or more first parcels has the same subdivision name. As another example, the shared characteristic may be that each of the one or more first parcels has the same land-use code. For example, the subdivision name for each parcel can be determined by applying the parcel data as an input to a subdivision name extraction machine learning model. The subdivision name extraction machine learning model can be executed multiple times, where each execution involves providing parcel data for one parcel as an input to the model. As another example, the subdivision name may be determined from a legal description or a subdivision name field in the parcel data. The land-use code for each parcel can be determined by applying a representation of a legal description of the respective parcel (e.g., a vector) as an input to a legal description classifier or by extracting such information from a land-use code field in the parcel data.

Optionally, the determined subdivision names for each parcel are applied as an input to a subdivision name classifier to determine whether each determined subdivision name is correct or incorrect. For example, the subdivision name classifier can be executed multiple times, where each execution involves providing a determined subdivision name for a parcel as an input to the classifier.

At block 608, polygons representing the one or more first parcels that share the characteristic are merged or grouped together to form a merged polygon. For example, the merged polygon may represent an original parcel. The original parcel may be the state of a parcel prior to a subdivision that resulted in the currently existing parcels.

The polygons can be merged or grouped by performing a polygon size enlargement, by using a nearest neighbor operation, by using a topology operation, and/or by using another polygon relationship identification operation. As one example, a size of the merged polygon can be enlarged along with the size of other merged and/or unmerged polygons. Optionally, the polygons of the one or more first parcels that are merged to form the merged polygon, other polygons merged to form other merged polygons, and/or those polygons that are not merged to form a merged polygon are enlarged instead of the merged polygons.

At block 610, the merged polygon is connected with one or more other polygons identified using a polygon relationship identification operation (e.g., using a polygon size enlargement, using a nearest neighbor operation, using a topology operation, etc.). As one example, a centroid of the merged polygon is determined, where the centroid of a merged and/or unmerged polygon can represent a node in the graph model. The centroids of the merged polygon, other merged polygons, and/or unmerged polygons that at least partially overlap can be connected. Thus, the graph model may include one or more nodes, at least some of which are connected to each other. After the merged polygon is connected with one or more other polygons identified using a polygon relationship identification operation, the graph model generation routine 600 ends, as shown at block 612.

Example Parcel Growth Machine Learning Model Training Routine

Figure 7:
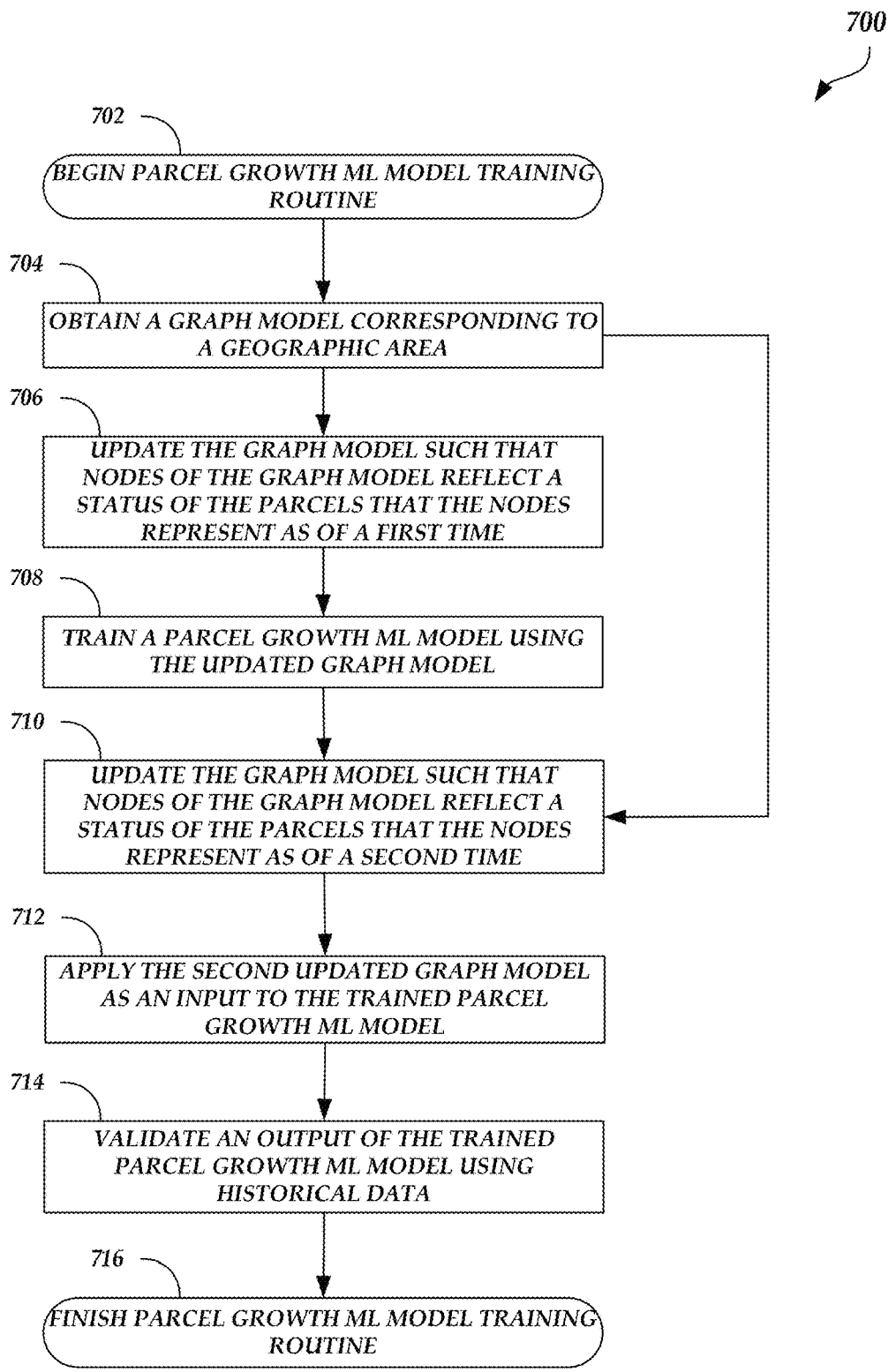
FIG. 7 is a flow diagram depicting an example, parcel growth machine learning model training routine illustratively implemented by a parcel growth prediction system, according to one embodiment.

FIG. 7 is a flow diagram depicting an example, parcel growth machine learning model training routine 700 illustratively implemented by a parcel growth prediction system, according to one embodiment. As an example, the parcel growth prediction system 120 of FIG. 1 (e.g., the parcel growth prediction model trainer 122) can be configured to execute the parcel growth machine learning model training routine 700. The parcel growth machine learning model training routine 700 begins at block 702.

At block 704, a graph model corresponding to a geographic area is obtained. The graph model may have been previously generated by the parcel graph model generator 121. After block 704, the parcel growth machine learning model training routine 700 can proceed to block 706 only or to both blocks 706 and 710. For example, as described below, block 706 is directed to operations performed that allow the parcel growth machine learning model to be trained, and block 710 is directed to operations performed that allow the parcel growth machine learning model to be validated. The training and validation of the parcel growth machine learning model can be performed sequentially or concurrently.

At block 706, the graph model is updated such that nodes of the graph model reflect a status of the parcels that the nodes represent as of a first time. For example, metadata of each node may be updated to indicate a status of the parcel corresponding to the respective node at the first time. The status of a parcel may be a developed status (e.g., the parcel was developed within the last N years of the first time), an undeveloped status (e.g., the parcel has not been developed at least within the last N years of the first time), and/or a vacant status (e.g., the parcel is a vacant lot). As an illustrative example, a node may be labeled with a "1" if the corresponding parcel has a developed status, and may be labeled with a "0" if the corresponding parcel has an undeveloped or vacant status.

At block 708, a parcel growth machine learning model is trained using the updated graph model. For example, the parcel growth machine learning model may be trained to output an indication of a probability that an undeveloped or vacant parcel is likely to be developed given the development or lack of development of neighboring parcels. The parcel growth prediction model trainer 122 may use a graph-based training algorithm, such as GraphSAGE, to perform the training using a graph model as training data. In further embodiments, the parcel growth machine learning model may be trained using multiple graph models that are each updated in a manner as described above with respect to block 706.

At block 710, the graph model is updated such that nodes of the graph model reflect a status of the parcels that the nodes represent as of a second time. For example, the second time may be after the first time, but before a current time. The second updated graph model reflecting a status of the parcels at a second time can be used to validate the previously trained parcel growth machine learning model.

At block 712, the second updated graph model is applied as an input to the trained parcel growth machine learning model. Applying the second updated graph model as an input to the trained parcel growth machine learning model may cause the trained parcel growth machine learning model to output a probability of development for one or more parcels in the geographic area. Optionally, the second updated graph model and an indication of a parcel for which a probability of development is desired are applied as inputs to the trained parcel growth machine learning model.

At block 714, an output of the trained parcel growth machine learning model is validated using historical data. For example, the output(s) of the trained parcel growth machine learning model may be compared with historical data indicating whether the corresponding parcels were or were not developed. The parcel growth prediction model trainer 122 can determine an error rate based on differences between the outputted probabilities and the actual development outcomes (e.g., where a development of a parcel by the second time may be considered 100% and a lack of development of a parcel by the second time may be considered 0%). If the error rate is high (e.g., greater than a threshold value or percentage), then the parcel growth prediction model trainer 122 may re-train or update the trained parcel growth machine learning model using different training data and/or different model hyperparameters to improve the accuracy of the parcel growth machine learning model. After the trained parcel growth machine learning model is validated, the parcel growth machine learning model training routine 700 ends, as shown at block 716.

Example Parcel Growth Prediction Routine

Figure 8:
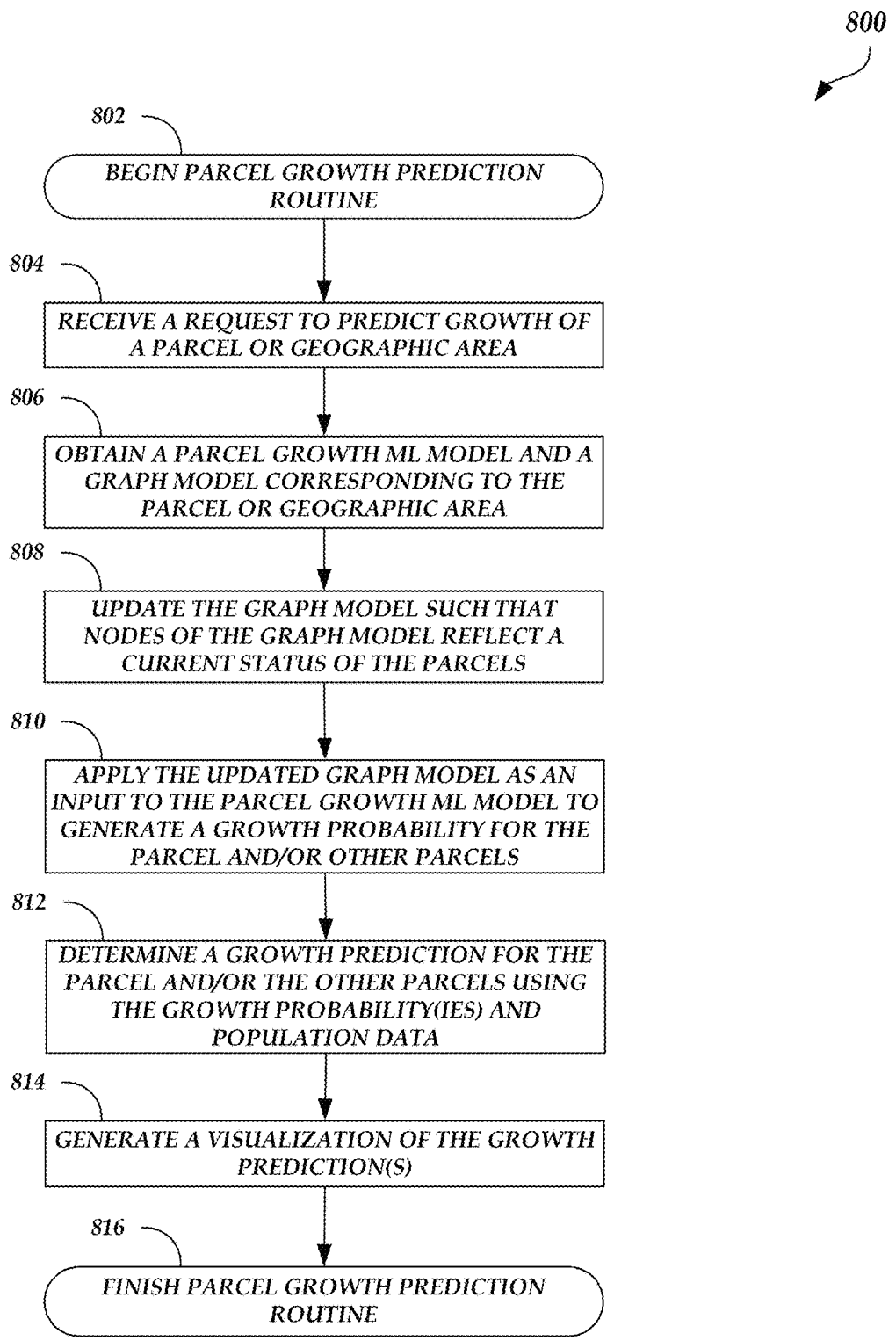
FIG. 8 is a flow diagram depicting an example, parcel growth prediction routine illustratively implemented by a parcel growth prediction system, according to one embodiment.

FIG. 8 is a flow diagram depicting an example, parcel growth prediction routine 800 illustratively implemented by a parcel growth prediction system, according to one embodiment. As an example, the parcel growth prediction system 120 of FIG. 1 (e.g., the parcel growth predictor 123) can be configured to execute the parcel growth prediction routine 800. The parcel growth prediction routine 800 begins at block 802.

At block 804, a request to predict growth of a parcel or a geographic area is received. The request may be received subsequent to or prior to the generation of a graph model and/or the training of a parcel growth machine learning model directed to the geographic area.

At block 806, a parcel growth machine learning model and a graph model corresponding to the parcel or geographic area are obtained. Optionally, the parcel growth machine learning model may be trained, as described above with respect to FIG. 7, if the training has not already occurred and/or the graph model may be generated, as described above with respect to FIG. 6, if the generation has not already occurred.

At block 808, the graph model is updated such that nodes of the graph model reflect a current status of the parcels. For example, the nodes may be updated such that the nodes reflect a status of the parcels at a time that the request is received.

At block 810, the updated graph model is applied as an input to the parcel growth machine learning model to generate a growth probability for the parcel and/or other parcels. Optionally, an indication of a parcel or set of parcels for which a growth probability is desired may be provided as an input to the parcel growth machine learning model as well.

At block 812, a growth prediction for the parcel and/or the other parcels may be determined using the growth probability(ies) and population data. For example, parcels can be ranked by growth probabilities. The population data can be used to determine average population growth in the geographic area, and metrics that define a square footage or other lot size that is sufficient to support an individual or a set of individuals can be used in conjunction with the average population growth to determine which highest ranked parcels, if developed, would be sufficient to support the expected population growth.

At block 814, a visualization of the growth prediction(s) is generated. For example, the visualization can be a table, an interactive geographic map, and/or the like. After the visualization is generated, the parcel growth prediction routine 800 ends, as shown at block 816.

ADDITIONAL EMBODIMENTS

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user to request and/or view growth predictions for one or more parcels.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for training a parcel growth artificial intelligence model, the system comprising:
    memory that stores computer-executable instructions; and
    a processor in communication with the memory, wherein the computer-executable instructions, when executed by the processor, cause the processor to:
        obtain a graph model corresponding to a geographic area, wherein the graph model comprises a first node that corresponds to a first parcel and that is connected to a second node that corresponds to a second parcel;
        update a status of the first node to reflect a development status of the first parcel at a first time;
        update a status of the second node to reflect a development status of the second parcel at the first time;
        train the parcel growth artificial intelligence model using the graph model with the updated status of the first node corresponding to the first time and the updated status of the second node corresponding to the first time;
        update a status of the first node to reflect a development status of the first parcel at a second time;
        update a status of the second node to reflect a development status of the second parcel at the second time;
        apply the graph model with the updated status of the first node corresponding to the second time and the updated status of the second node corresponding to the second time as an input to the trained parcel growth artificial intelligence model to obtain a growth probability; and
        validate the trained parcel growth artificial intelligence model based on a comparison of the growth probability with historical data corresponding to a development or lack of development of the first and second parcels by the second time.

2. The system of claim 1, wherein the computer-executable instructions, when executed, further cause the processor to:
    determine an error rate based on the validation of the trained parcel growth artificial intelligence model; and
    re-train the trained parcel growth artificial intelligence model in response to a determination that the error rate exceeds a threshold value.

3. The system of claim 2, wherein the computer-executable instructions, when executed, further cause the processor to re-train the trained parcel growth artificial intelligence model using a hyperparameter that is different than a hyperparameter used to train the parcel growth artificial intelligence model.

4. The system of claim 1, wherein the development status of the first parcel at the first time comprises one of a developed state, an undeveloped state, or a vacant state.

5. The system of claim 4, wherein the undeveloped state is the first parcel has not been developed at least within a threshold time period of the first time.

6. The system of claim 4, wherein the developed state is a structure was built on the first parcel at least within a threshold time period of the first time.

7. The system of claim 1, wherein the development status of the first parcel at the first time is a developed state, wherein the development status of the second parcel at the first time is a vacant state, wherein the development status of the first parcel at the second time is the developed state, and wherein the development status of the second parcel at the second time is the developed state.

8. The system of claim 1, wherein the computer-executable instructions, when executed, further cause the processor to update metadata of the first node to reflect the development status of the first parcel at the first time.

9. The system of claim 1, wherein the parcel growth artificial intelligence model comprises a machine learning model.

10. The system of claim 1, wherein the second time is after the first time and before a current time.

11. A computer-implemented method for training a parcel growth artificial intelligence model, the computer-implemented method comprising:
    obtaining a graph model corresponding to a geographic area, wherein the graph model comprises a first node that corresponds to a first parcel and that is connected to a second node that corresponds to a second parcel;

updating a status of the first node to reflect a status of the first parcel at a first time;

updating a status of the second node to reflect a status of the second parcel at the first time;

training the parcel growth artificial intelligence model using the graph model with the updated status of the first node corresponding to the first time and the updated status of the second node corresponding to the first time;

updating a status of the first node to reflect a status of the first parcel at a second time;

updating a status of the second node to reflect a status of the second parcel at the second time;

applying the graph model with the updated status of the first node corresponding to the second time and the updated status of the second node corresponding to the second time as an input to the trained parcel growth artificial intelligence model to obtain a growth probability; and validating the trained parcel growth artificial intelligence model based on a comparison of the growth probability with historical data corresponding to a development or lack of development of the first and second parcels by the second time.

12. The computer-implemented method of claim 11, further comprising:

determining an error rate based on the validation of the trained parcel growth artificial intelligence model; and re-training the trained parcel growth artificial intelligence model in response to a determination that the error rate exceeds a threshold value.

13. The computer-implemented method of claim 12, wherein re-training the trained parcel growth artificial intelligence model further comprises re-training the trained parcel growth artificial intelligence model using a hyperparameter that is different than a hyperparameter used to train the parcel growth artificial intelligence model.

14. The computer-implemented method of claim 11, wherein the status of the first parcel at the first time comprises one of a developed state, an undeveloped state, or a vacant state.

15. The computer-implemented method of claim 14, wherein the developed state is a structure was built on the first parcel at least within a threshold time period of the first time.

16. The computer-implemented method of claim 11, wherein updating a status of the first node further comprises updating metadata of the first node to reflect the status of the first parcel at the first time.

17. A non-transitory, computer-readable medium comprising computer-executable instructions for training a parcel growth artificial intelligence model, wherein the computer-executable instructions, when executed by a computer system, cause the computer system to:

obtain a graph model corresponding to a geographic area, wherein the graph model comprises a first node that corresponds to a first parcel and that is connected to a second node that corresponds to a second parcel;

train the parcel growth artificial intelligence model using the graph model with a status of the first node corresponding to a first time and a status of the second node corresponding to the first time;

apply the graph model with a status of the first node corresponding to a second time and a status of the second node corresponding to the second time as an input to the trained parcel growth artificial intelligence model to obtain a growth probability; and validate the trained parcel growth artificial intelligence model based on a comparison of the growth probability with historical data corresponding to a development or lack of development of the first and second parcels by the second time.

18. The non-transitory, computer-readable medium of claim 17, wherein the computer-executable instructions, when executed, further cause the computer system to:

determine an error rate based on the validation of the trained parcel growth artificial intelligence model; and re-train the trained parcel growth artificial intelligence model in response to a determination that the error rate exceeds a threshold value.

19. The non-transitory, computer-readable medium of claim 18, wherein the computer-executable instructions, when executed, further cause the computer system to re-train the trained parcel growth artificial intelligence model using a hyperparameter that is different than a hyperparameter used to train the parcel growth artificial intelligence model.

20. The non-transitory, computer-readable medium of claim 17, wherein the computer-executable instructions, when executed, further cause the computer system to update metadata of the first node to reflect the status of the first parcel at the first time.

* * * * *